United States Patent [19]

Nishiyama et al.

[11] Patent Number: 5,740,142
[45] Date of Patent: Apr. 14, 1998

[54] METHOD AND APPARATUS FOR FAST TRANSFER OF DATA IN RECORDING AND REPRODUCING SYSTEM

[75] Inventors: Nobumasa Nishiyama, Odawara; Hajime Aoi, Tachikawa, both of Japan

[73] Assignee: Hitachi, Ltd., Tokyo, Japan

[21] Appl. No.: 691,191

[22] Filed: Aug. 5, 1996

[30] Foreign Application Priority Data

Aug. 7, 1995 [JP] Japan .................................. 7-201149

[51] Int. Cl.$^6$ ........................................................ G11B 7/00
[52] U.S. Cl. ........................................ 369/59; 369/50; 369/48
[58] Field of Search .................................. 369/59, 47, 48, 369/49, 50, 54, 58, 32, 124; 360/48, 32

[56] References Cited

U.S. PATENT DOCUMENTS 5,307,213   4/1994   Nishiyama .
5,337,198   8/1994   Nishiyama et al. .

OTHER PUBLICATIONS

D.A. Patterson et al., "A Case for Redundant Arrays of Inexpensive Disks (RAID)", ACM, 1988, pp. 109–116.

Primary Examiner—Muhammad N. Edun

[57] ABSTRACT

A fast data transfer system capable of eliminating the need to extremely increase the necessary transmission frequency band for the high-density recording and fast revolution rate of data recording and reproducing system has a recording and reproduced signal processor including an encoder/decoder, a disk enclosure including a parallel-to-serial converter, a record head, and a serial-to-parallel converter, and a transmission cable, and makes recording parallel data transfer from the encoder/decoder to a recording amplifier by shifting the phases of a plurality of recording signals and reproduced parallel data from the serial-to-parallel converter to the encoder/decoder by shifting the phases of a plurality of reproduced signals. The necessary transmission frequency on the transmission cable can be reduced by this parallel data transfer on the transmission cable. In addition, a record timing correction circuit can be provided on a parallel data transfer path.

20 Claims, 22 Drawing Sheets

AMOUNT OF RECORD TIMING CORRECTION $W_C$

RECORDING DATA

RECORD CLOCK
AFTER CORRECTION

AMOUNT OF RECORD TIMING CORRECTION $W_C$

CONDITION A

CLOCK OF
LOW FREQUENCY (NO ERROR)

AMOUNT OF RECORD TIMING CORRECTION $W_C$

CONDITION B

CLOCK OF
HIGH FREQUENCY (ERROR GENERATED)

FIG. 5

TRUTH TABLE FOR RECORD TIMING CORRECTION

| DATA BITS (ARROW: CORRECTION DIRECTION) | | | RESULT OF TIMING ANALYSIS * | | |
|---|---|---|---|---|---|
| X $b_{-1}$ | Y $b_0$ | Z $b_{+1}$ | E | N | L |
| 0 | 0 | 0 | 0 | 0 | 0 |
| 0 | 0 | 1 | 0 | 0 | 0 |
| 0 | 1 | 0 | 0 | 1 | 0 |
| 0 | ←1 | 1 | 1 | 0 | 0 |
| 1 | 0 | 0 | 0 | 0 | 0 |
| 1 | 0 | 1 | 0 | 0 | 0 |
| 1 | →1 | 0 | 0 | 0 | 1 |
| 1 | 1 | 1 | 0 | 1 | 0 |

\*
E: LEAD CORRECTION
N: NO CORRECTION
L: LAG CORRECTION

TIMING CHART FOR TIMING CORRECTION CIRCUIT

ENL RETRIEVAL LOGIC DIAGRAM

BLOCK DIAGRAM FOR ONE-BYTE ENL RETRIEVAL LOGIC

BLOCK DIAGRAM OF ENL REGISTER

FIG. 10 BLOCK DIAGRAM OF REGISTER OF TIMING CORRECTION CIRCUIT

FIG. 11 BLOCK DIAGRAM FOR CLOCK CONTROL OF TIMING CORRECTION CIRCUIT

BLOCK DIAGRAM FOR PARALLEL TRANSMISSION PROCESSING

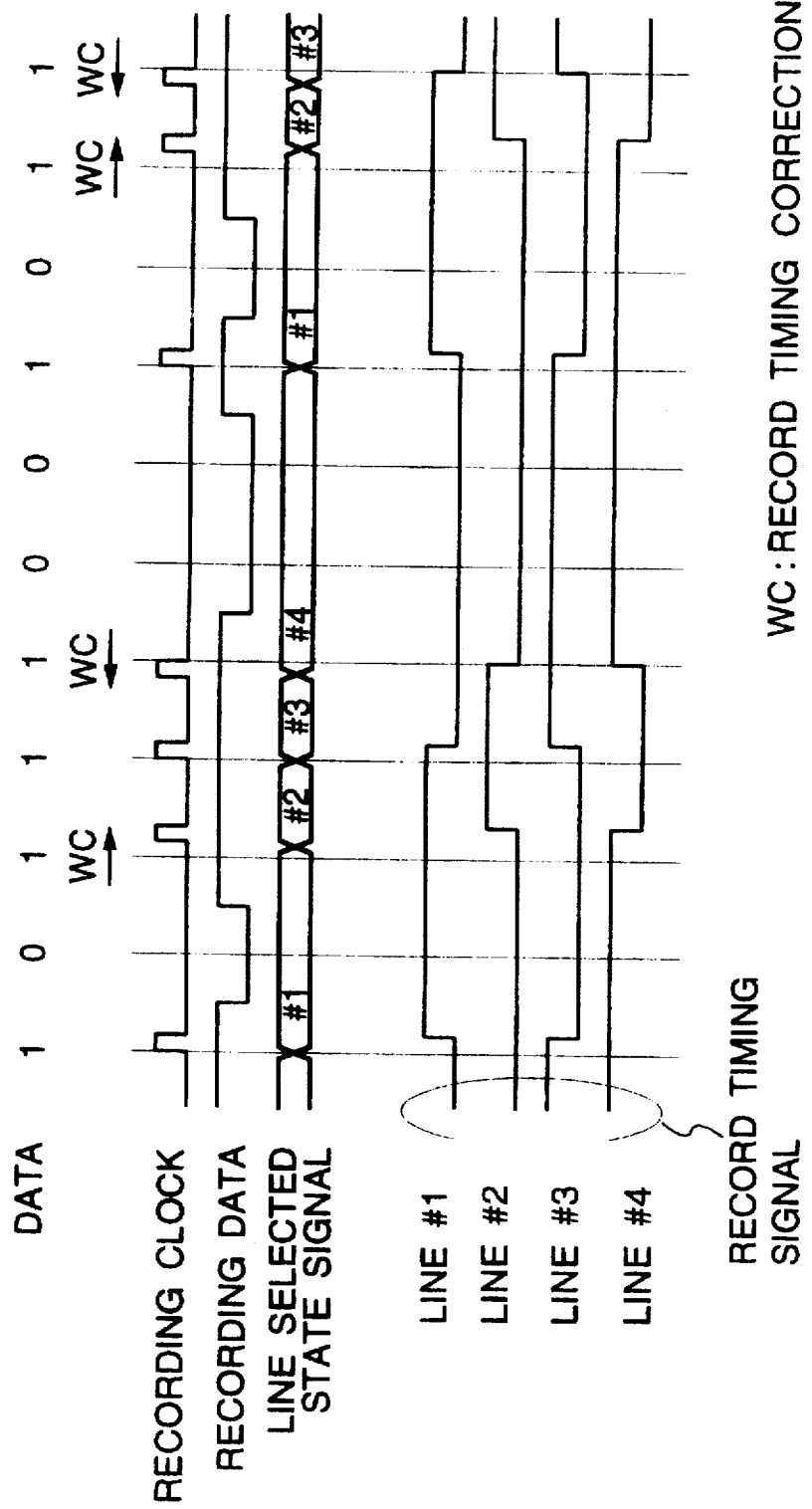

IDEA FOR TRANSMISSION BAND FOR AMOUNT OF CORRECTION, RISE AND FALL TIME

IDEA FOR TRANSMISSION BAND FOR AMOUNT OF CORRECTION, RISE AND FALL TIME

MODE A

IDEA FOR TRANSMISSION BAND FOR AMOUNT OF CORRECTION, RISE AND FALL TIME

MODE B

EXAMPLE OF FOUR-LINE TRANSMISSION

EXAMPLE OF TWO-LINE TRANSMISSION

EXAMPLE OF FIVE - LINE TRANSMISSION

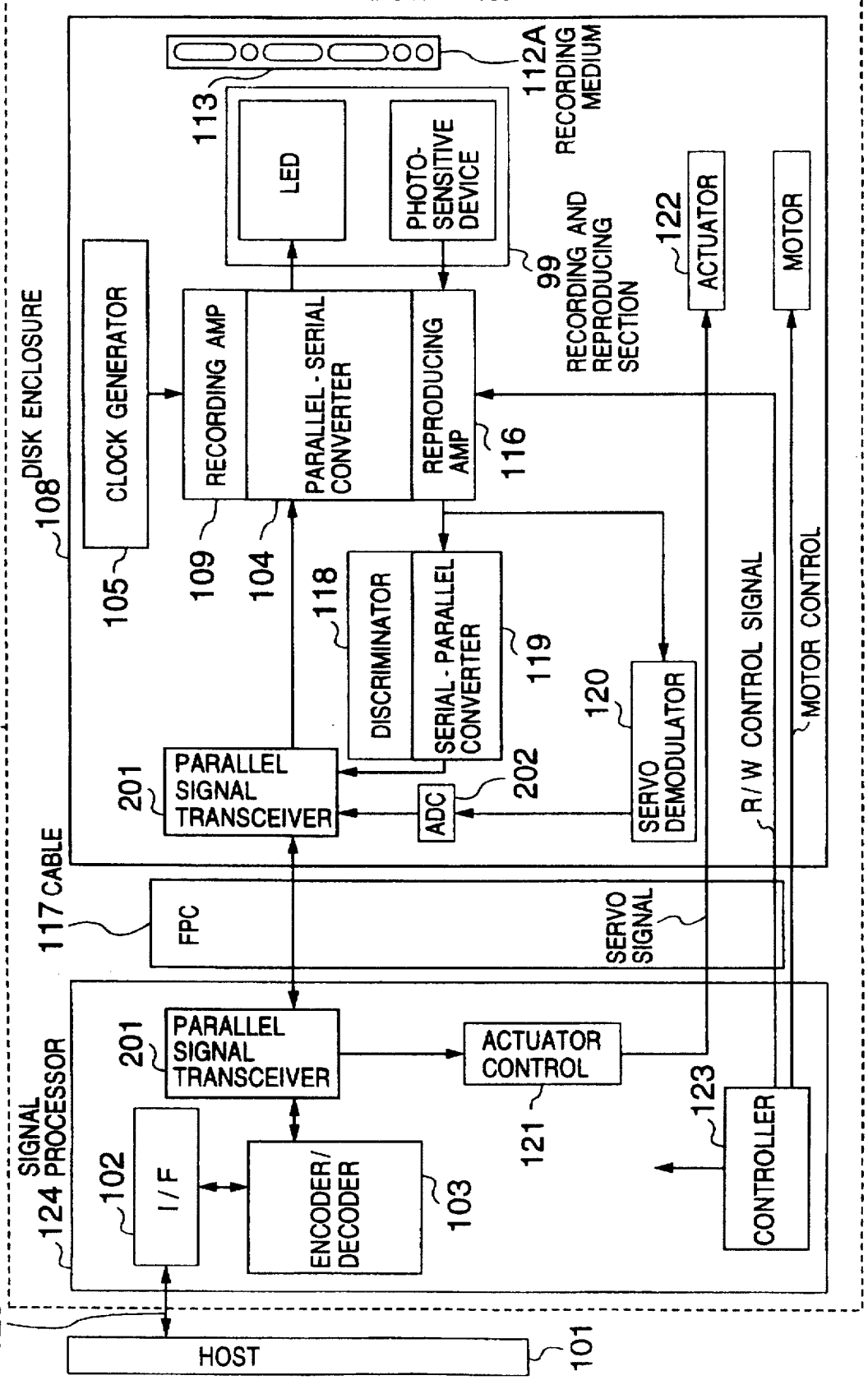

METHOD AND APPARATUS FOR FAST TRANSFER OF DATA IN RECORDING AND REPRODUCING SYSTEM

BACKGROUND OF THE INVENTION

The present invention generally relates to a data recording and reproducing system for recording digital information on a magnetic or optical recording medium by inversion of magnetization or change of magnetization direction or by change of optical phase and reproducing the recorded magnetized information or optical information from the medium. Particularly, this invention relates to a data recording and reproducing system that requires fast transfer of data.

There are related publications of U.S. Pat. Nos. 5,337,198 and 5,307,213 filed by Nishiyama and others on Aug. 9 and Apr. 23, 1994, respectively, and of document "A Case for Redundant Arrays of Inexpensive Disks (RAID)" written by D. A. Patterson et al., in 1988 ACM SIGMOD Conference, Chicago, Ill., June 1988, pp. 109–116.

The conventional magnetic disk system receives the information to be recorded from the host via a parallel data interface (hereinafter, referred to as I/F circuit). The received information is converted into serial data by a parallel-serial converter that uses a record clock generated from a record clock generator. The serial data is transmitted through an FPC as the record clock to a recording amplifier of an actuator within a disk enclosure, and then it is magnetically recorded on a recording medium as a magnetized inversion pattern by a record head.

At the time of reproduction, the waveform of a signal reproduced from a reproduce head is amplified and supplied in an analog form to a discriminator through a flexible pattern wiring or circuit (called FPC). This signal is converted into parallel data by a serial-parallel converter, decoded by an encoder/decoder, and then fed to the host.

By the way, the clock frequency for data transfer has been increased together with the development of fast transfer of large data. The conventional magnetic disk recorder converts input parallel data into serial data before transfer because of a limit to the magnetic recording system. Therefore, the serial data transmission path requires a higher transmission frequency band. If the data transfer rate is, for example, 10 MB/s, a 10-MHz clock is enough for an 8-bit parallel interface, but an 80-MHz clock eight times higher than that must be used for the serial data transfer.

However, by examining the data transfer circuits within the system, it will be found that the signal transmission distance can be decreased by high-density integration and packaging of components on the electronic circuit board because of the down sizing tendency. This increases the tendency toward a wide frequency band. However, there is no change in the distance from the electronic circuit board as a recording and reproduced signal processor via the FPC to the recording and reproducing amplifiers within the disk enclosure. FIG. 1 shows a conventional example having this drawback.

From the standpoint of transmission frequency band, the transmission of a sequence of pulses is the most severe when the pulse interval is the narrowest. In the magnetic recording and reproducing system, this state will appear when record timing correction is made on the record clock in order to correct for the peak shift in a two-bit pattern. In this case, the record timing correction can include the following two types depending on the peak shift:

(A) When the peak-to-peak distance is increased because of an interference occurring between the reproduced waveforms of a certain bit and the neighboring bit, the record timing correction is made to narrow the distance between bits.

(B) When the peak-to-peak distance is decreased because of a bit distance shift occurring at the time of recording a magnetization sandwitched between two magnetizations opposite thereto, or because of nonlinear bit shift, the record timing correction is made to increase the bit distance.

Of the two types of record timing correction, the type (A) for reducing the bit distance affects the most on the transmission path. The problems in the transmission will be described.

The relationship between the maximum value of the pulse width of the record clock and the amount of record timing correction can be expressed by the following equation:

$$\left( \begin{array}{l} \text{PULSE WIDTHS}(P_W) \leq \dfrac{100 - (W_{c_1} + W_{c_2})}{2} \\ \text{PULSE WIDTH } (P_W) \geq k \cdot t_r \text{ and } \geq k \cdot t_f \end{array} \right) \quad (1)$$

where $t_r$ and $t_f$ are the rise time and fall time of pulse, and $W_c$ is the amount of record timing correction.

When a narrow pulse signal waveform like the record clock for data being recorded as shown in FIG. 1 is transmitted, the rise time and fall time of pulse are increased due to the insufficient frequency band of the transmission path. Under a lower-speed transfer condition A in FIG. 2, since the signal waveform has a relatively low frequency, the pulse width can be kept more than the rise time and fall time of pulse. Under a high-speed transfer condition B in FIG. 3, since the record clock of pulse is increased, the rise time and fall time of pulse are relatively longer than the pulse width. As a result, the record clock is lost on the transmission path or causes pulse-separation error. Therefore, in order to make fast data transfer, it is necessary to limit the amount of record clock correction or improve the characteristics of the transmission path.

As described above, the fast data transfer, or high-frequency clock transmission becomes difficult.

Thus, the data transfer rate is required to be high without broadening the transmission frequency band.

A multi-drive system is proposed by D. A. Patterson et al., as described in "A Case for Redundant Arrays of Inexpensive Disks (RAID)", ACM, 1988 (pp. 109–116). This system has drives the number of which corresponds to the number of bits. In this proposed example, since serial data is not applied to the whole system, the transmission frequency is not so high, but serial data is transferred for each drive. Thus, at least one head will suffice for each drive, but the number of drives to be provided is necessary to correspond to at least that of the parallel bits. In addition, these drives must rotate in synchronism with each other. Accordingly, this multi-drive system is not suitable for small-sized recording and reproducing systems in which only a single drive must be provided.

SUMMARY OF THE INVENTION

It is an object of the invention to provide a data recording and reproducing method and system capable of the fast data transfer that has not been achieved so far because of a low transmission frequency band on the transmission path between the recording and reproducing processor and the disk enclosure.

It is another object of the invention to provide a transmission method and apparatus which are used within a data recording and reproducing system and which are capable of using a small number of circuits within the disk enclosure and suppressing temperature rise.

According to the present invention, there is provided a data recording system for recording data on a recording medium, including a signal processor having an input circuit to which data is supplied, transmission lines connected to the signal processor to transmit parallel data, a converter connected to the transmission lines to convert the parallel data into serial data, and a disk enclosure having data recording and reproducing heads connected to the converter and a recording medium. The transmission lines are a plurality of parallel lines that are impedance-matched at the connections with the converter and the input circuit. The signal processor can have a parallel transmission processing circuit that generates the record clock indicating a plurality of logical values of data in series and that supplies to the parallel lines a plurality of inverting signals each indicating one of the plurality of logical values. A plurality of signals of different phases depending on the difference and equality between the values of two adjacent pieces of data are supplied to the plurality of transmission lines. The signal processor may have a timing correction circuit for changing the time interval between certain signal changes within the record clock. The time interval between signal changes on a plurality of signals of different phases that are supplied to the plurality of transmission lines is at least twice the time interval between two adjacent pieces of data.

That is, in this invention, although the data transmission path is of parallel lines, for the necessity of using at least one head for recording and reproduction the record clock is generated from the clock for parallel transmission, and parallel data is converted into serial data just before recording, and recorded as serial data.

Moreover, in order to make high-density recording, the so-called bit shift must be reduced by record timing correction. Since a wide frequency band is necessary for serial data, the record timing correction is made for parallel data. The record timing correction for parallel data has not been considered so far.

According to the present invention, since parallel data is transmitted along all the transmission path and corrected for record timing, the transmission frequency band is not necessary to extremely increase. Therefore, the transfer rate of parallel data can be increased up to the limit of the transmission frequency band.

BRIEF DESCRIPTION OF THE DRAWINGS

FIG. 5 is a truth table for record timing correction;

FIG. 20 is a timing chart of a record clock distributing circuit;

FIG. 25 is a block diagram of another embodiment of the invention.

DESCRIPTION OF THE PREFERRED EMBODIMENTS

The magnetic or optical recording and reproducing system sends to and receives from the host, 101 parallel data. However, the magnetic heads (record head 114 and reproduce head 115) or optical heads (a light emitting device and photosensitive device) only record and reproduce serial data. Thus, parallel data is transmitted just until information is recorded, and each kind of signal processing is made on parallel data. The present invention relates particularly to a signal transmission system for fast transmission of parallel data. In addition, according to the invention, a system has been devised by which each kind of signal processing can be made on parallel data.

The first embodiment of the invention will be described with reference to FIG. 4.

Figure 1:
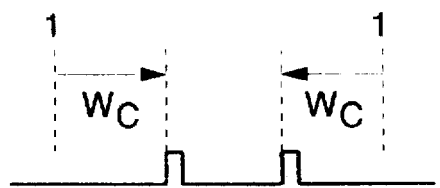
FIG. 1 is a waveform diagram showing the width of record timing correction.
Figure 2:
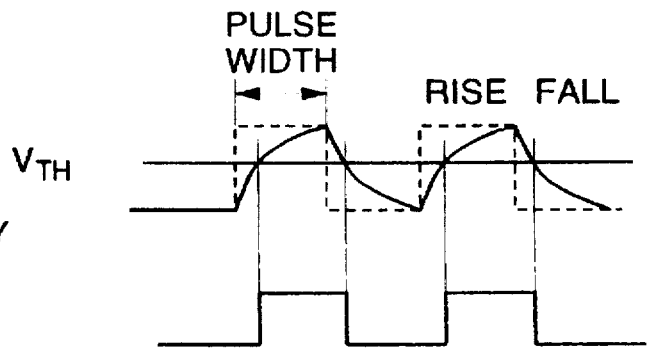
FIGS. 2 and 3 show the relations among the transmission frequency band, the rise time and the fall time.
Figure 3:
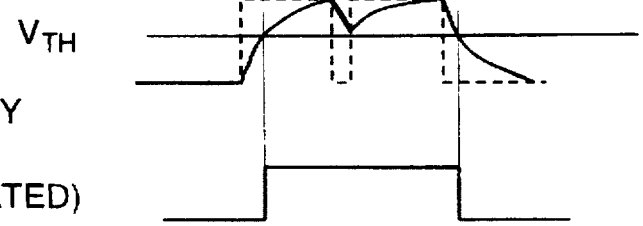
Figure 4:
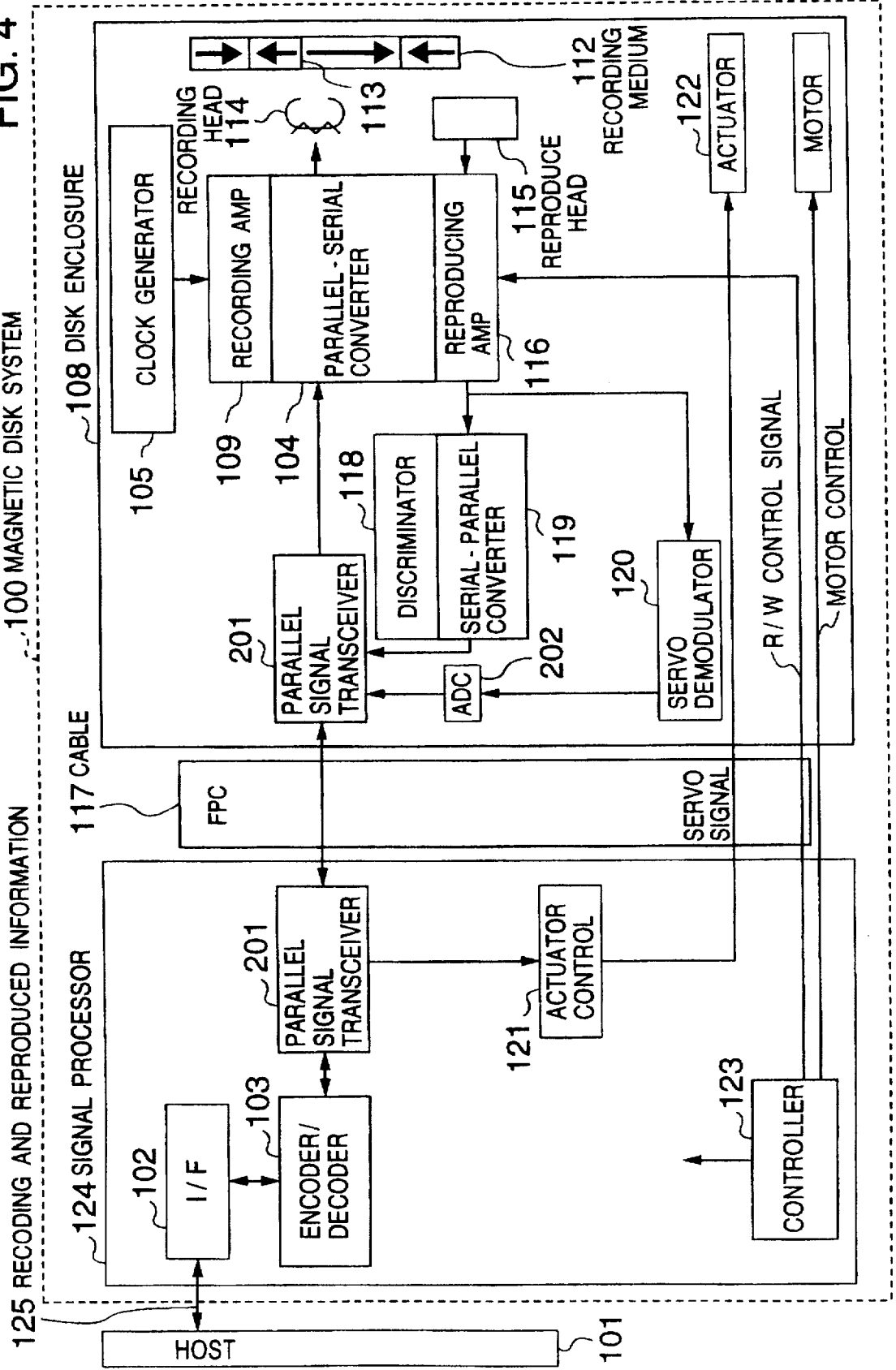
FIG. 4 is a block diagram of an embodiment of the invention.

Referring to FIG. 4, the recording and reproducing channel of a magnetic disk system 100 of this embodiment is formed of a parallel interface 102, an encoder/decoder 103, a parallel-serial converter 104, a record clock generator 105, a recording amplifier 109, a record head 114, a recording medium 112, a reproduce head 115, a reproducing amplifier 116, a discriminating circuit 118 and a serial-parallel converter 119. The magnetic disk system 100 also has a recording and reproduced signal processor 124, a disk enclosure 108 and a transmission cable 117 of, for example, a flexible pattern cable (FPC) that connects the processor and the enclosure. The magnetic disk system 100 is a magnetic recording and reproducing system in which the recording signal is transferred in parallel between the encoder/decoder 103 and the recording amplifier 109, and in which the reproduced signal is transferred in parallel between the encoder/decoder 103 and the discriminating circuit 118.

In this embodiment, the parallel data from the encoder/decoder 103 is transmitted through the FPC 117 to the recording amplifier 109. The transmission frequency of the FPC 117 is lower than in the conventional serial data transfer system.

Moreover, since the recording and reproducing operations are exclusive modes to each other, the transmission cable for transfer of parallel data can be used to be common to the recording and reproduction operations. Therefore, parallel signal transceivers 201 are provided before and after the transmission cable, respectively, so that, at the time of recording, data can be transmitted from the encoder/decoder 103 to the recording amplifier 109 and, at the time of reproducing, data can be transmitted from the discriminating circuit 118 to the encoder/decoder 103. The transmission cable 117 may use wires (for example, FPC) that have made impedance matching at the ends to both transceivers, thereby preventing the transmitted signal from being reflected from the transceivers.

The reproduced signal includes a servo signal. The servo signal is required to bypass the discriminating circuit 118 because it is converted in quite a different manner from the data code conversion. For this purpose, a servo demodulator 120 is separately provided to receive only the servo signal. Since the transmission cable is used for parallel transfer of digital signal, the servo signal is converted into a digital signal by an analog-to-digital converter 202 (hereinafter, abbreviated ADC), and then supplied to the parallel signal transceiver 201. The parallel signal transceivers 201 are controlled in their recording/reproduction/servo control modes by control signals from a controller 123, so that switching control can be made on the transmission directions and input/output relations.

Another embodiment will be described in which a record timing correction circuit 203 is provided to correct parallel data, thereby making it possible to transmit parallel data through the transmission lines of which the maximum data transfer frequency is lower.

The second embodiment concerning the record timing correction circuit system that can be used for the parallel data will be described with reference to FIGS. 5, 6, 7, 8, 9, 10, 11, 18.

The record timing correction circuit 203 corrects the record timing of the central bit (Y) when the data bits are "011" or "110" as indicated in FIG. 5. The record timing correction circuit 203 detects the above pattern from the parallel pattern data and controls the corresponding bit to make the record timing fast or late. The retrieval and control methods for the above pattern will be described below.

In FIG. 5, no timing shift N, lagging correction L and leading correction E can be expressed by the logic equations (2), (3) and (4), respectively.

$$E = Y \text{ AND } (X \text{ EXOR } Y) \text{ AND } (X \text{ EXOR } Z) \quad (2)$$

$$N = Y \text{ AND } (X \text{ ENOR } Z) \quad (3)$$

$$L = Y \text{ AND } (X \text{ ENOR } Y) \text{ AND } (X \text{ EXOR } Z) \quad (4)$$

where Y is the bit at which timing shift is made, X is one bit before and Z is one bit after. Also, ENOR is exclusive NOR, and EXOR is exclusive OR.

Figure 6:
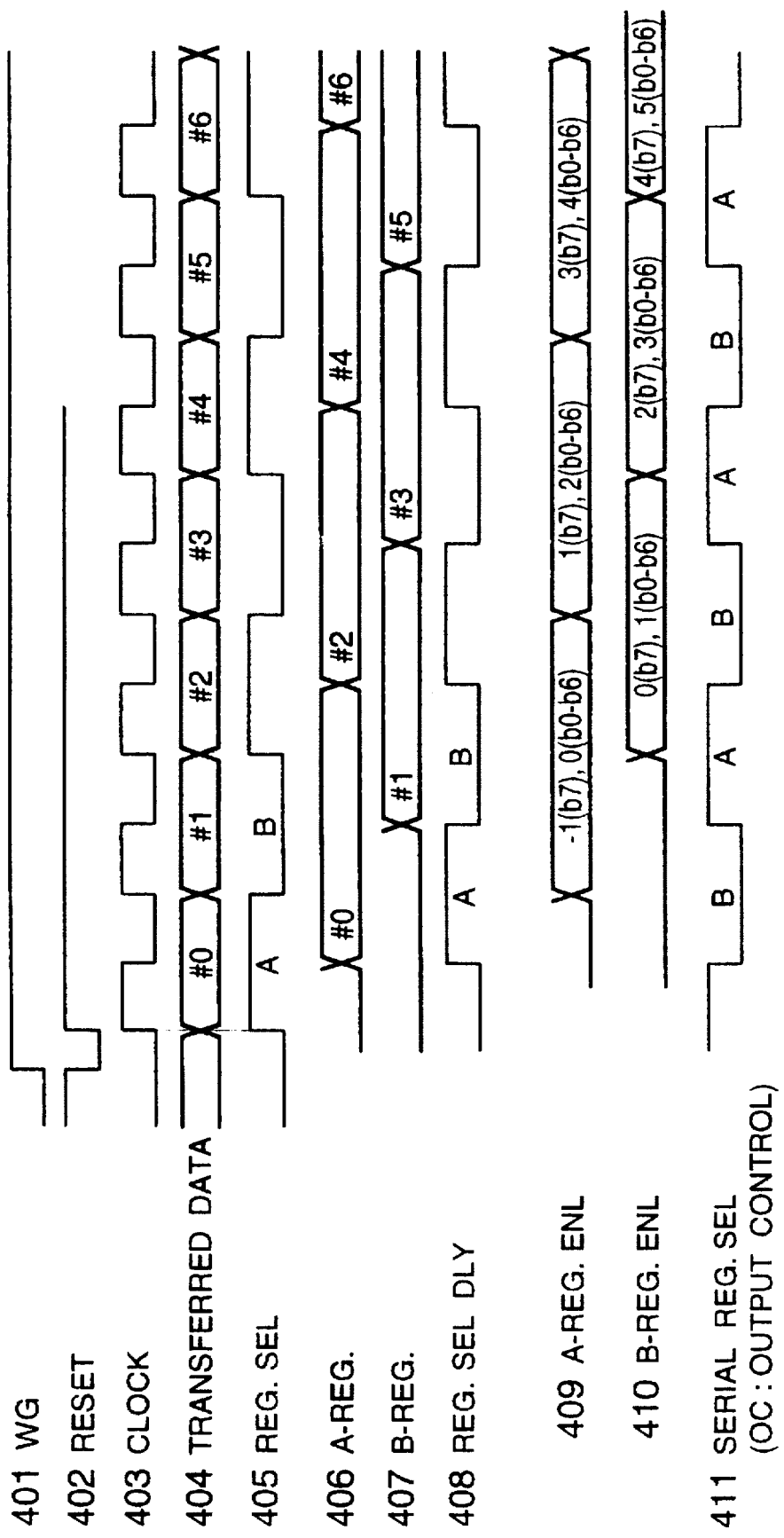
FIG. 6 is a timing chart to which reference is made in explaining the operation of a record timing correction circuit.

The E, N and L are determined by the above logic equations and the parallel pattern data. FIG. 6 is a timing chart for the E, N and L.

First, a WG signal 401 is turned "H" for recording of information as illustrated. When the WG signal is "H", a reset signal 402 is generated for initializing the recording circuits. The reset signal 402 clears each register of the circuits.

Then, a clock 403 for transmission of parallel data and parallel transfer data 404 synchronized with the leading edges of the clock are transmitted from the encoder/decoder 103. Since the record timing correction is determined by the combination of the preceding bit and the following bit, the last bit of the first parallel data #0 and the first bit of the next parallel data #1 are to have a relation with the correction. For this purpose, it is necessary to hold at least two-clock part of the transferred data. Thus, two registers (A, B) 406, 407 are used and alternately operated to store the transmitted parallel data 404 at the trailing edges of the clock 403.

Then, the pattern for record timing correction is detected from the parallel data. In order to search for the pattern over two pieces of parallel data, it is necessary to simultaneously search the contents of the two registers. The pattern retrieval is performed at the leading edge of pulse, one clock after the data transfer clock 403. The preferential register at that time depends on the state of an Reg. Sel DLY signal 408. If a pattern corresponding to E, N, L is found as a result of pattern retrieval, it is registered in an ENL register 409 for A-Reg. or an ENL register 410 for B-Reg.

Finally, the record timing correction is made by a record clock generated from the data transfer clock 403, and at the same time the parallel data is converted into serial data. The register for the parallel-to-serial conversion is represented by the inverse state of the Reg. Sel DLY signal (Serial Reg. Sel signal 411).

Figure 7:
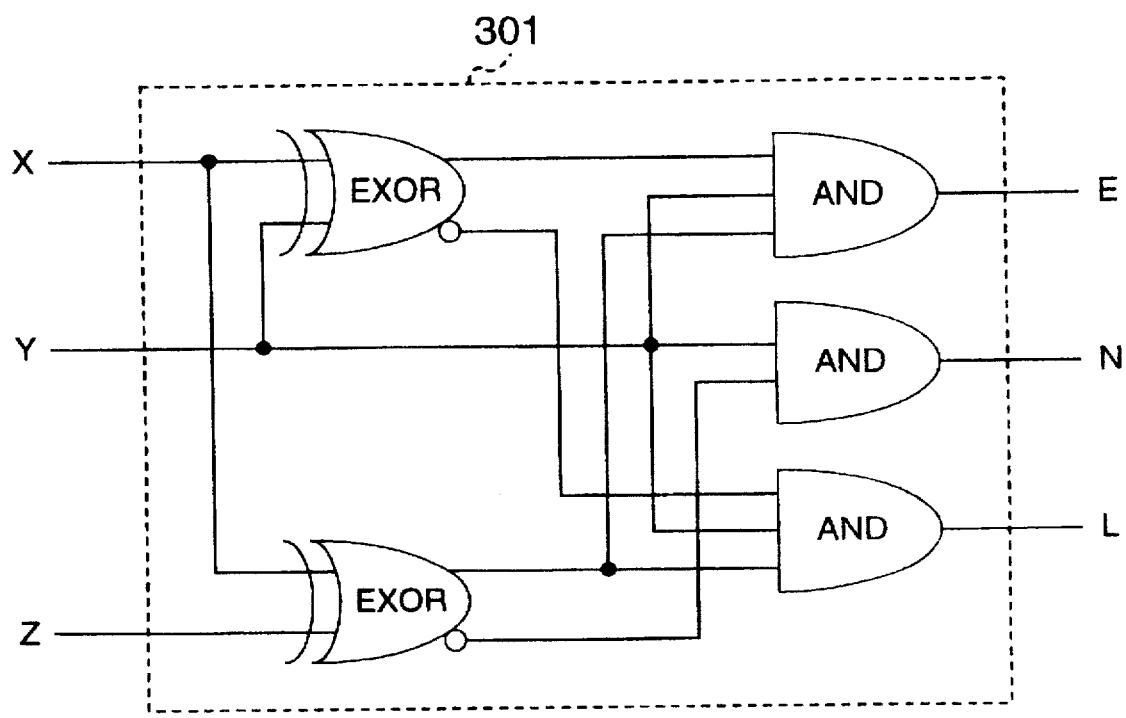
FIG. 7 is a logic diagram for ENL retrieval.

FIG. 7 shows a logic circuit 301 for detecting an ENL state from the three-bit patterns. This logic circuit handles the equations (2), (3) and (4).

Figure 8:
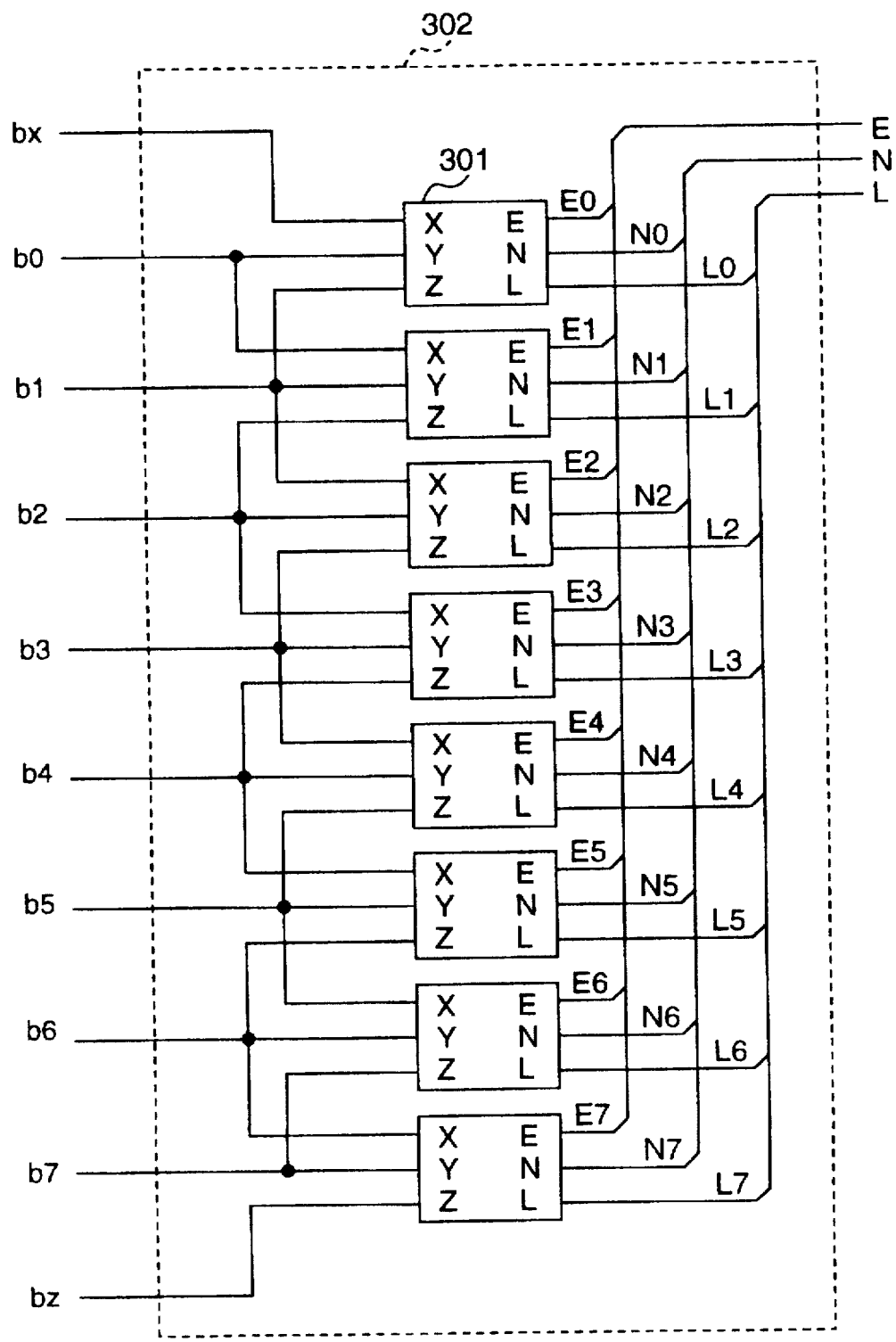
FIG. 8 is a block diagram for one byte of ENL retrieval logic.

FIG. 8 is a circuit arrangement 302 having the ENL retrieval logic circuits 301 provided in order to handle 8-bit parallel data. The parallel data are represented by bits b0 to b7. For the ENL of bits b0 and b7, those bits including a bit bx one bit before b0 and a bit bz one bit after b7 are searched at the same time. In order to make retrieval under the logic state, data of three bytes is necessary. Thus, a searching method using data of two bytes has been devised. This method will hereinafter be described.

Two-clock part of the parallel data, or the first and second bytes are stored. Then, the ENL retrieval is performed for the bit b7 of the first byte and the bits b0 to b6 of the second byte. At this time, since the range of retrieval is the patterns including the preceding bit and the following bit, the bits necessary for retrieval are b6 and b7 of the first byte and all bits of the second byte.

Figure 9:
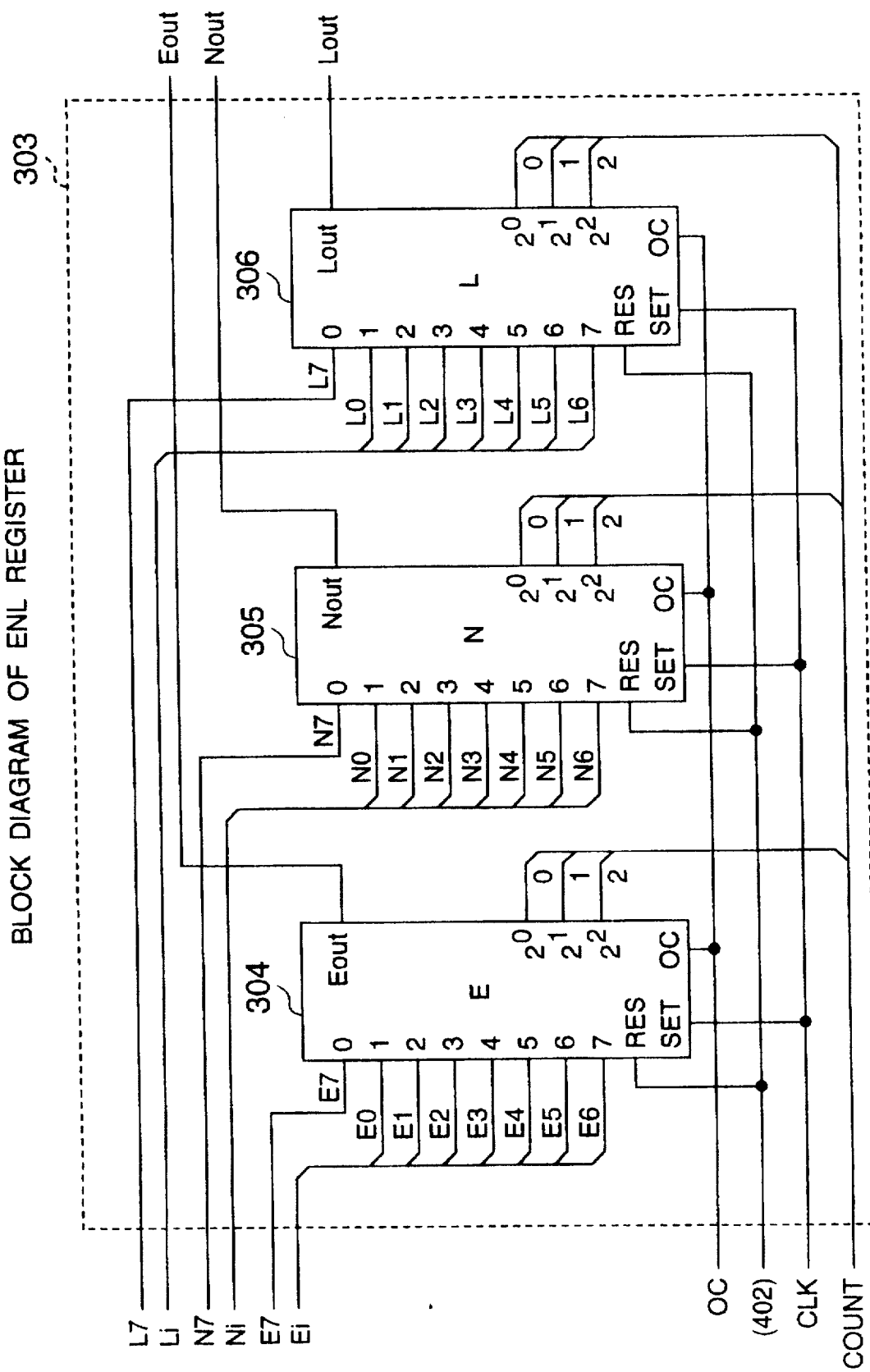
FIG. 9 is a block diagram of an ENL register.

The states of E, N, L corresponding to the bit b7 of the first byte and the bits b0 to b6 of the second byte as a result of ENL retrieval are stored in registers 304, 305, 306 as shown in FIG. 9. A Count signal of a record clock generated from the data transfer clock selects one input terminal of each register 304, 305, 306 for ENL. The selected input is produced at an output Eout. Since the Count signal is generated from the record clock, it is a clock for bits and is used to make parallel-to-serial conversion.

Figure 10:
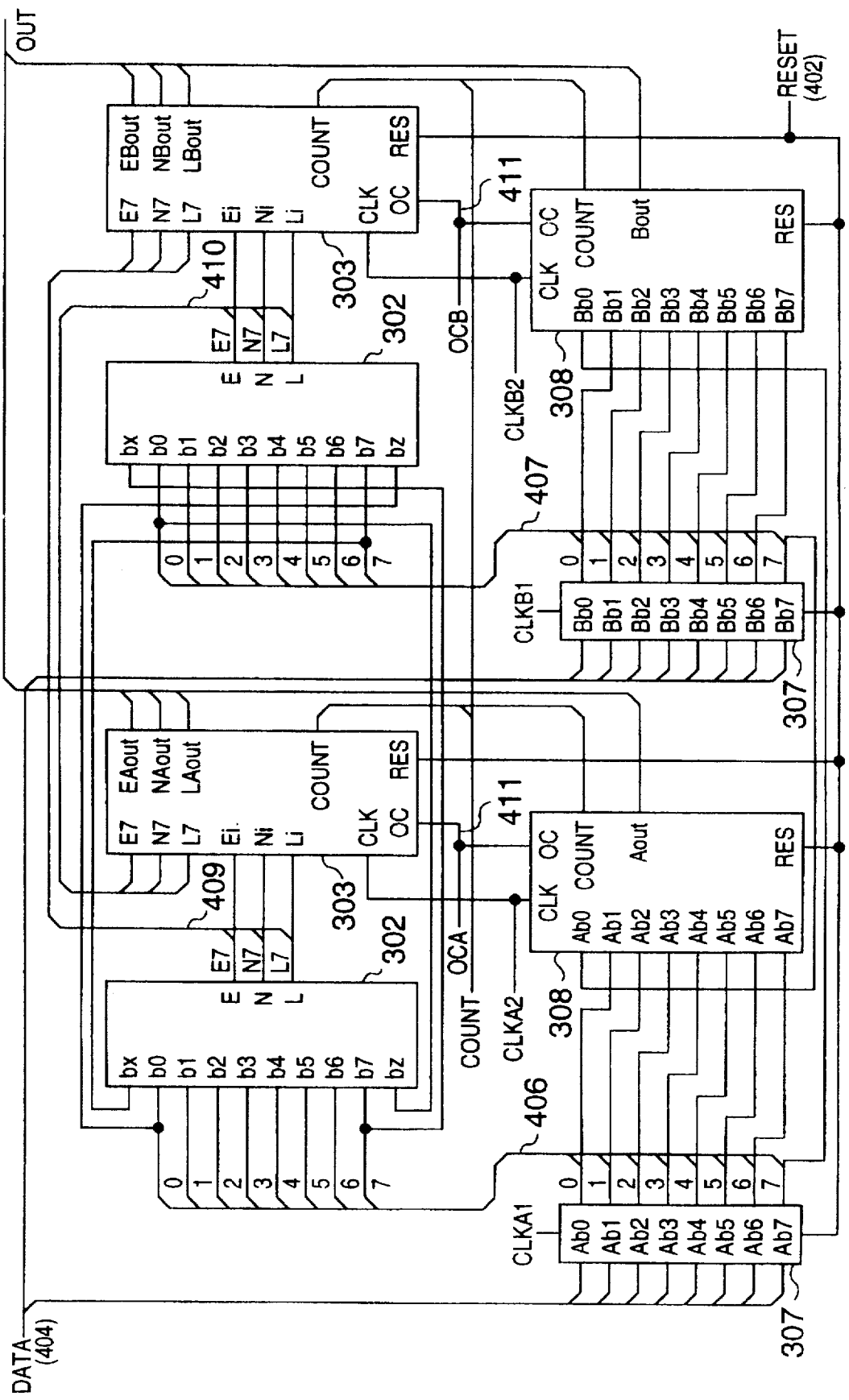
FIG. 10 is a block diagram of a register portion of the record timing correction circuit.
Figure 11:
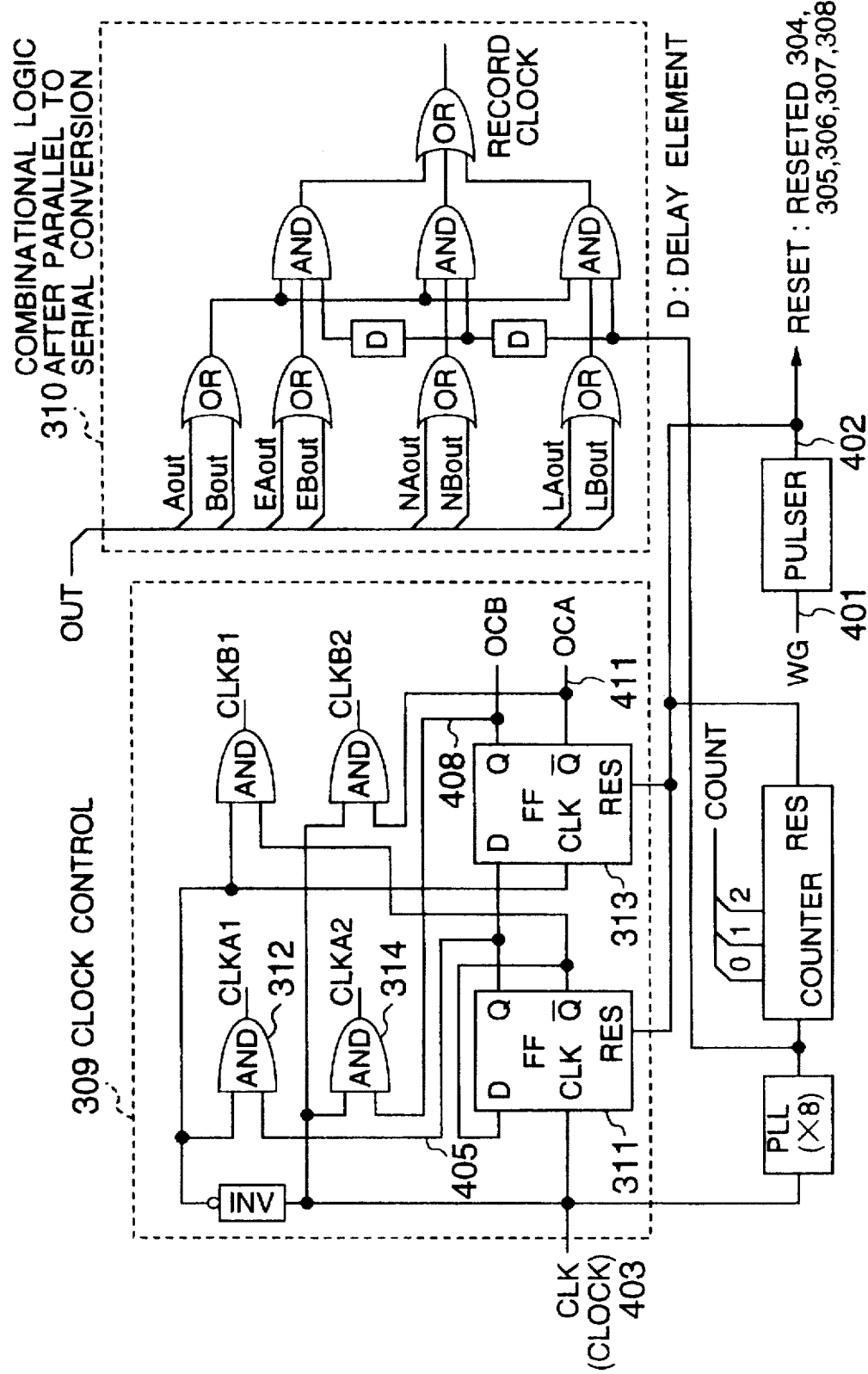
FIG. 11 is a block diagram for the clock control of the record timing correction circuit.

FIGS. 10 and 11 show portions of the record timing correction circuit 203 having the circuits of FIGS. 8 and 9 provided as main elements. The circuit arrangement of FIG. 10 includes main circuits 302, 303 and registers 307, 308. The circuit arrangement of FIG. 11 includes a clock control block 309 for setting each register, and a combinational logic block 310 for the logic after parallel-to-serial conversion. When the WG signal 401 is turned "H", the reset signal 402 is generated. The reset signal 402 initializes the registers 303, 307 and 308.

The operation of those circuits will be described below.

When the leading edge of the clock (CLK) signal is fed to the clock control block 309, a flip-flop 311 produces an inverted output, or Q output of "H". When the inverted signal is "H" as a result of passing the clock (CLK) through an inverter, an AND circuit 312 produces "H" at output CLKA1. When the inverted signal of the clock (CLK) is changed to "H", a flip-flop 313 makes its D-input state, "H" be directly produced at its Q-output, or its Q-output is turned "H". Then, the next pulse "H" of the clock (CLK) signal comes, an AND circuit 314 produces "H" at its output CLKA2.

Accordingly, a clock signal one clock delayed is produced at the output CLKA2 of the AND circuit 314. At the same time, the output of the flip-flop 311 is again inverted at the leading edge of the clock (CLK) signal, and as a result the Q-inverse output is turned "H". Thus, through the same sequence as in the above description, the signal corresponding to CLKA1 appears at CKLB1, and the signal corresponding to CLKA2 is produced at CLKB2.

Of the clock signals generated for setting the respective registers, CLKA1 and CLKA2 are used for A-register-purpose clock signals, and CLKB1 and CLKB2 for B-register-purpose clock signals. The A-register-purpose clock and B-register-purpose clock are alternately generated at every clock (CLK).

The data 404 is set in the registers 307 shown in FIG. 10 by the above clocks and undergoes ENL retrieval in the registers 302, 303. The results are converted into serial data and fed to the output end OUT. The OUT signal includes bit data and ENL information. These data and ENL information are supplied to the combinational logic block 310, and added to the record clock signal that has already been processed for record timing correction.

This embodiment can search for the record timing correction pattern directly from the patterns of the transmitted parallel data, and correct the timing of the record clock.

Figure 12:
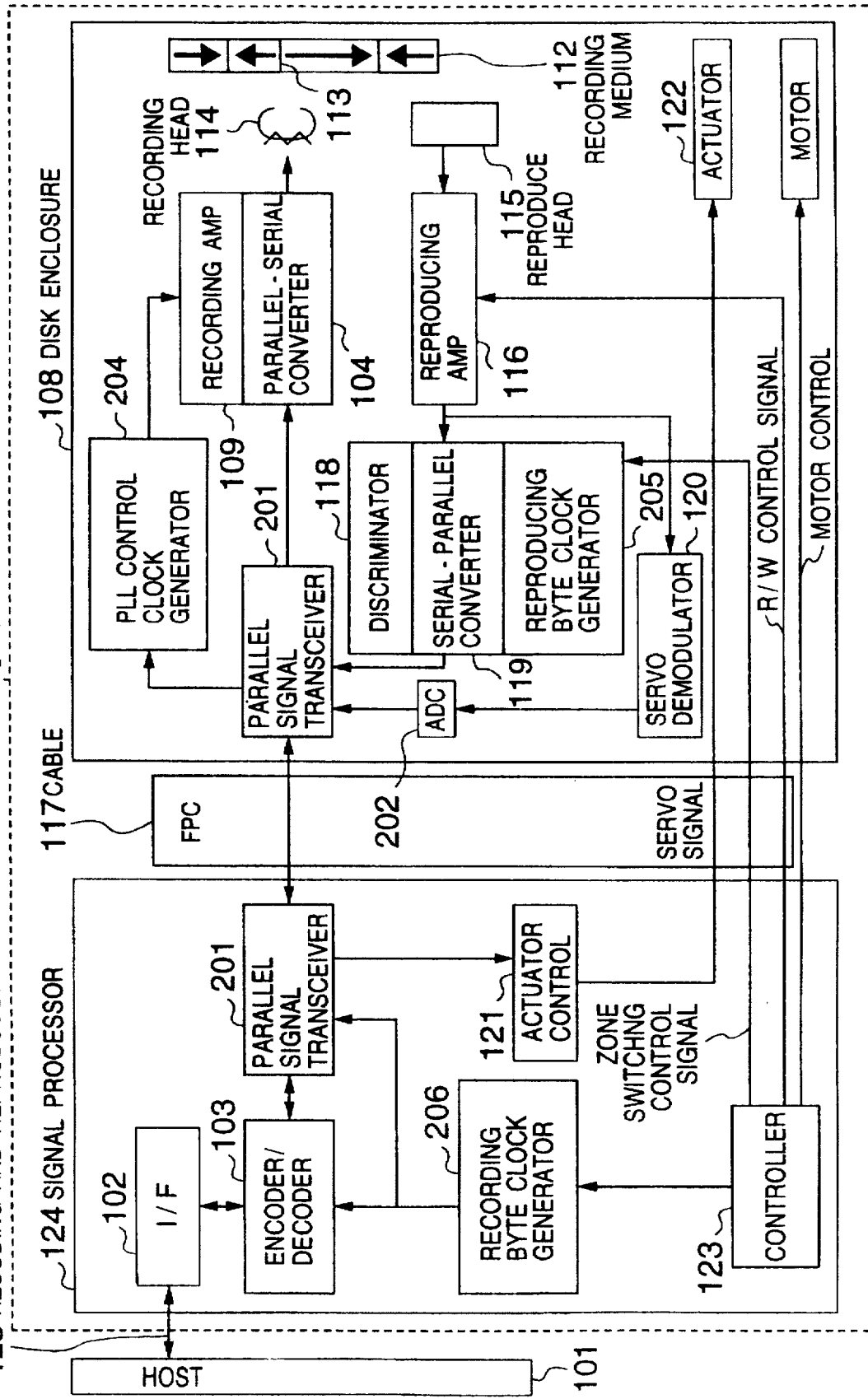
FIG. 12 is a block diagram of another embodiment of the invention.

The third embodiment of the invention will be described with reference to FIG. 12.

The recording and reproducing channel of the magnetic disk system 100 of this embodiment is formed of the parallel interface 102, the encoder/decoder 103, the parallel-to-serial converter 104, the recording amplifier 109, the record head 114, the recording medium 112, the reproduce head 115, the reproducing amplifier 116, the discriminating circuit 118 and the serial-to-parallel converter 119. The magnetic disk system 100 also has the recording and reproduced signal processor 124, the disk enclosure 108, and the transmission cable 117 of, for example, FPC that connects the processor and the enclosure. The recording signal is transferred in parallel from the encoder/decoder 103 to the recording amplifier 109, and the reproduced signal is transferred in parallel from the discriminating circuit 118 to the encoder/decoder 103. The clock signal for transfer of parallel data is generated from a reproducing-purpose byte clock generator 206 of the recording and reproduced signal processor 124. The disk enclosure 108 has a record clock generator 204 for oscillating in synchronism with the parallel data transfer clock. The parallel data transfer clock for the reproduced signal is generated by a reproducing-purpose byte clock generator 205 on the basis of the synchronous oscillator of the discriminating circuit 118.

In this embodiment, since the record clock generator 204 and the reproduced data transfer clock generator 205 are not simultaneously operated, a common phase-locked loop (PLL) oscillator may be used for both generators.

Figure 13:
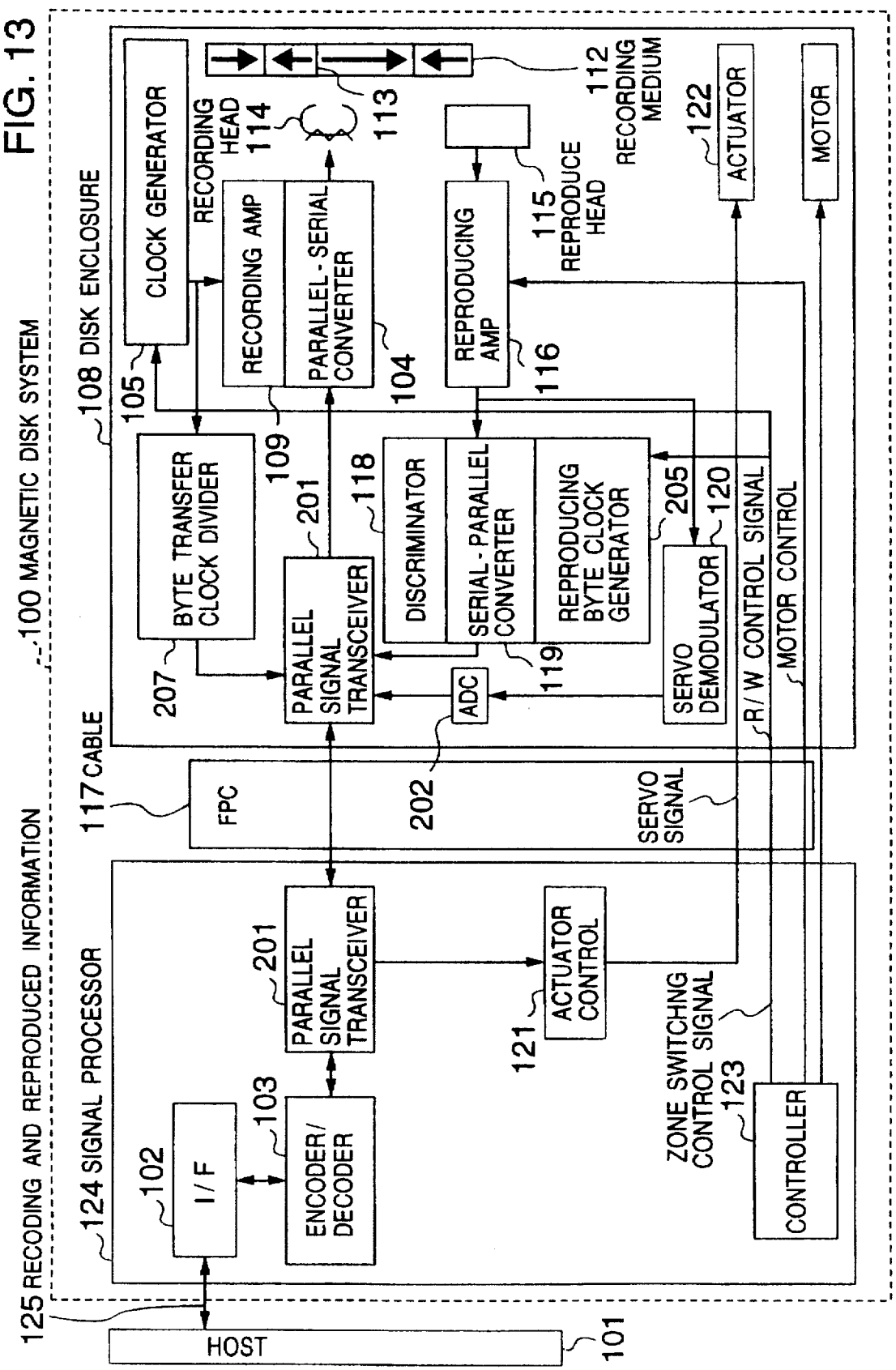
FIG. 13 is a block diagram of still another embodiment of the invention.

The fourth embodiment of the invention will be described with reference to FIG. 13.

The recording and reproducing channel of the magnetic disk system 100 of this embodiment is formed of the parallel interface 102, the encoder/decoder 103, the parallel-to-serial converter 104, the record clock generator 105, the recording amplifier 109, the record head 114, the recording medium 112, the reproduce head 115, the reproducing amplifier 116, the discriminating circuit 118 and the serial-to-parallel converter 119. The magnetic disk system 100 also has the recording and reproduced signal processor 124, the disk enclosure 108, and the transmission cable 117 of, for example, FPC that connects the processor and the enclosure. The recording signal is transferred in parallel from the encoder/decoder 103 to the recording amplifier 109, and the reproduced signal is transferred in parallel from the discriminating circuit 118 to the encoder/decoder 103. The record clock generator 105 has a function for changing the oscillation frequency in response to the position of the record and reproduce heads 114, 115 along the radius of the disk. The oscillation output from the record clock generator 105 is divided in frequency at a byte transfer clock purpose frequency-dividing circuit 207. The frequency-divided signal is used as a parallel data transfer clock for the recording data. In addition, the parallel data transfer clock for transfer of the reproduced signal is generated from the reproducing-purpose byte clock generator 205 on the basis of the synchronous oscillator of the discriminating circuit 118.

Figure 15:
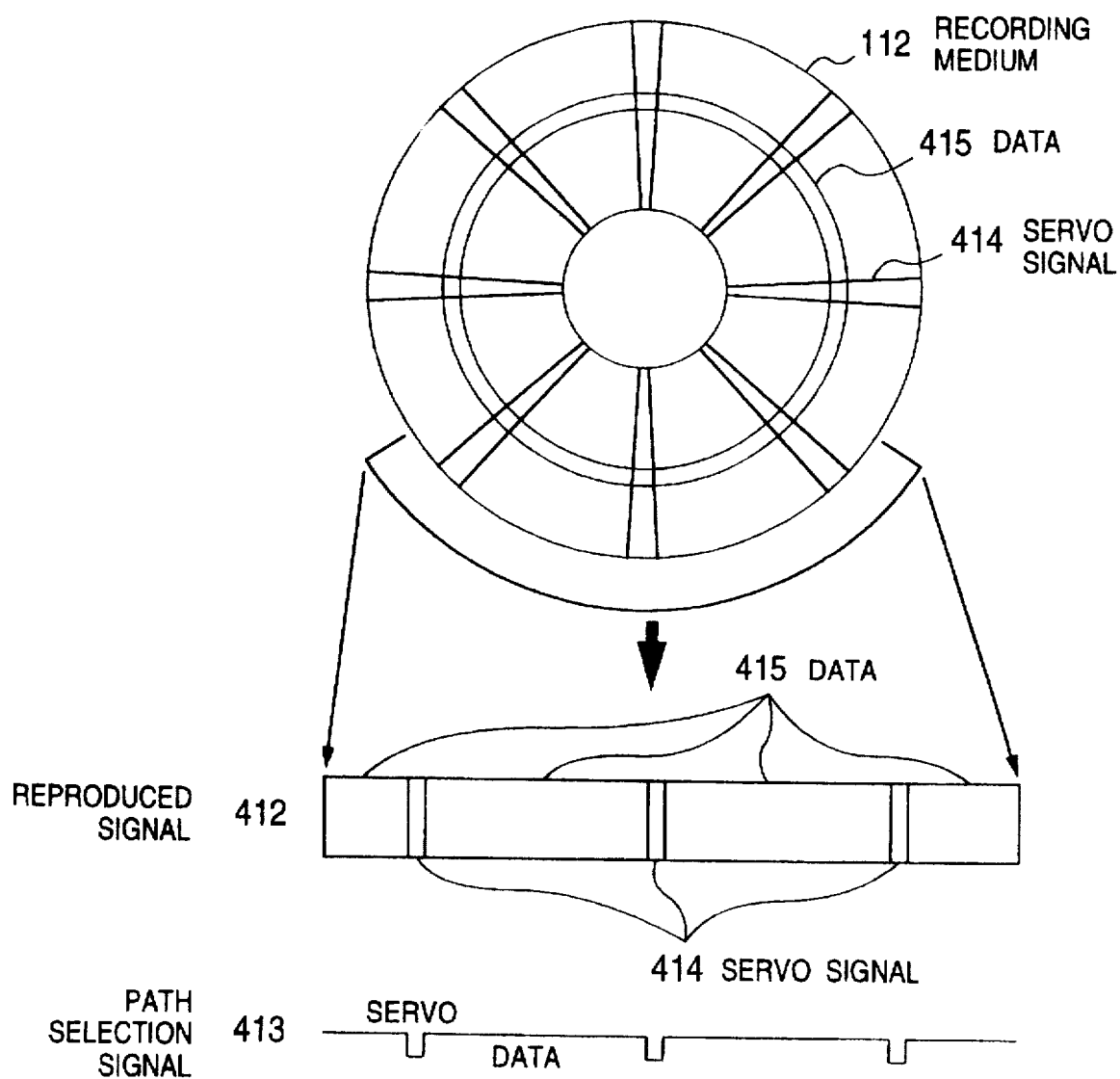
FIG. 15 shows a track format on a recording medium.

As illustrated in FIG. 15, a servo signal 414 is embedded in part of a reproduced signal 412. In the third and fourth embodiments, a path selection signal 413 is used to detect the servo regions, and the servo signal is demodulated. The data regions, 415 of the reproduced signal are discriminated into information of "1", "0" by the discriminating circuit, and produced as parallel data. The servo signal 414 is demodulated by the servo demodulator 120, and the demodulated output is converted into a digital code by the analog-to-digital converter 202 (ADC). Then, the digital code is transmitted in parallel through the parallel signal transceiver 201. On the recording and reproduced signal processor 124, the servo signal portion is extracted from the parallel signal and supplied to an actuator control portion 121. The output from the actuator control portion 121 is fed as the servo signal to an actuator 122, thus making positioning control.

In this embodiment having the servo signal processing function, the recording and reproducing channel of the magnetic disk system 100 is formed of the parallel interface 102, the encoder/decoder 103, the parallel-to-serial converter 104, the record clock generator 105, the recording amplifier 109, the record head 114, the recording medium 112, the reproduce head 115, the reproducing amplifier 116, the discriminating circuit 118 and the serial-to-parallel converter 119. The magnetic disk system 100 also has the recording and reproduced signal processor 124, the disk enclosure 108, and the transmission cable 117 of, for example, FPC that connects the processor and the enclosure. The recording signal is transferred in parallel from the encoder/decoder 103 to the recording amplifier 109, and the reproduced signal is transferred in parallel from the discriminating circuit 118 to the encoder/decoder 103. The output from the reproducing amplifier 116 is fed to both the discriminating circuit 118 and the servo demodulator 120, and the servo signal region 414 of the reproduced signal is processed by the servo signal processing circuits. The data region 415 is processed by the data signal processing circuits and transmitted as parallel data through the cable, only the servo information being extracted after the transmission.

In the above embodiment, since the recording and reproduction are not performed at the same time and since the transmitted data is digital, the transmission cable can be used to be common to the recording and reproduction modes.

Figure 16:
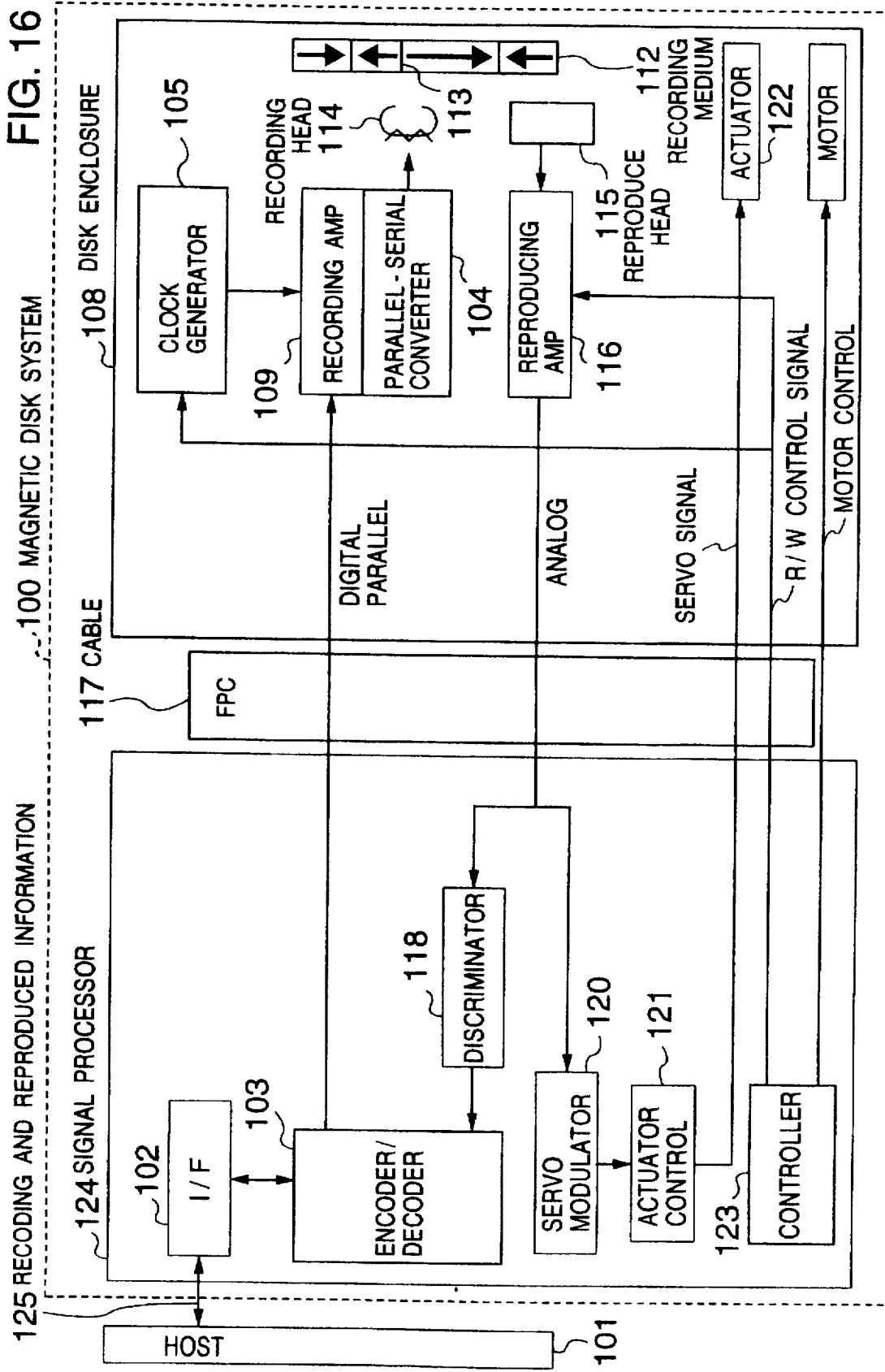
FIG. 16 is a block diagram of further embodiment of the invention.

The fifth embodiment of the invention will be described with reference to FIG. 16.

The recording and reproducing channel of the magnetic disk system 100 of this embodiment is formed of the parallel interface 102, the encoder/decoder 103, the parallel-to-serial converter 104, the record clock generator 105, the recording amplifier 109, the record head 114, the recording medium 112, the reproduce head 115, the reproducing amplifier 116, the discriminating circuit 118 and a servo signal processing section (servo signal demodulator 120, actuator control circuit 121). The magnetic disk system 100 also has the recording and reproduced signal processor 124, the disk enclosure 108, and the transmission cable 117 of, for example, FPC that connects the processor and the enclosure to transmit the recording signal. In the magnetic disk system, the recording signal is transferred in parallel from the encoder/decoder 103 to the recording amplifier 109, and the reproduced signal is transferred in an analog form from the reproducing amplifier 116 to the discriminating circuit 118 or servo demodulator 120.

Figure 14:
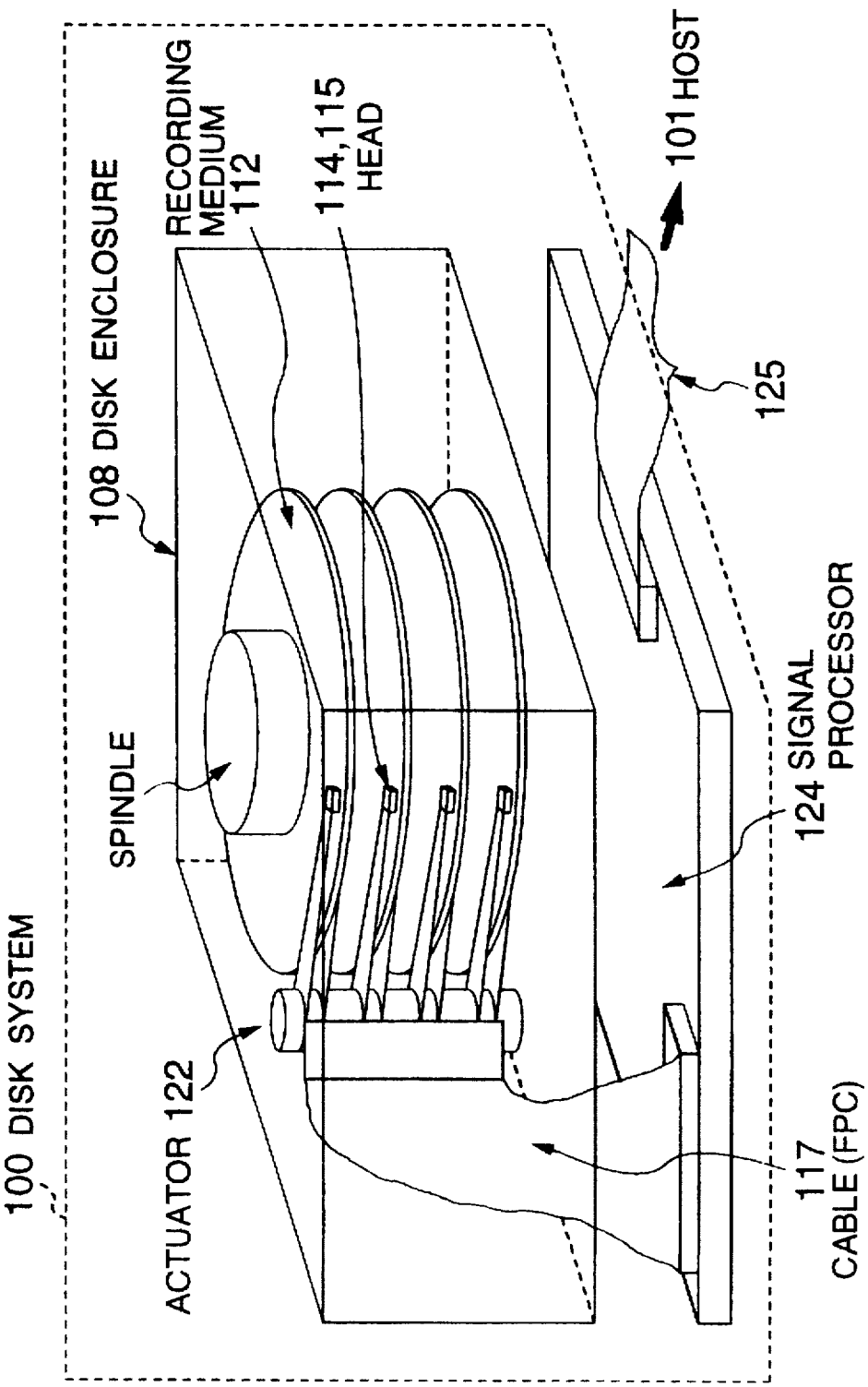
FIG. 14 is an external view of a disk enclosure in the embodiments of the invention.

In this embodiment, since the recording data is transferred in parallel, fast transfer is possible. In addition, since the discriminating circuit 118 and the servo signal processing section can be provided in the recording and reproduced signal processor 124 as in the prior art, the scale of the circuits that can be built within the disk enclosure 108 in FIG. 14 can be reduced. Therefore, the amount of heat generated from the circuits is decreased so that the temperature rise within the disk enclosure 108 can be suppressed. Accordingly, it is possible to reduce the effect of the temperature rise on the recording and reproducing characteristics.

Figure 17:
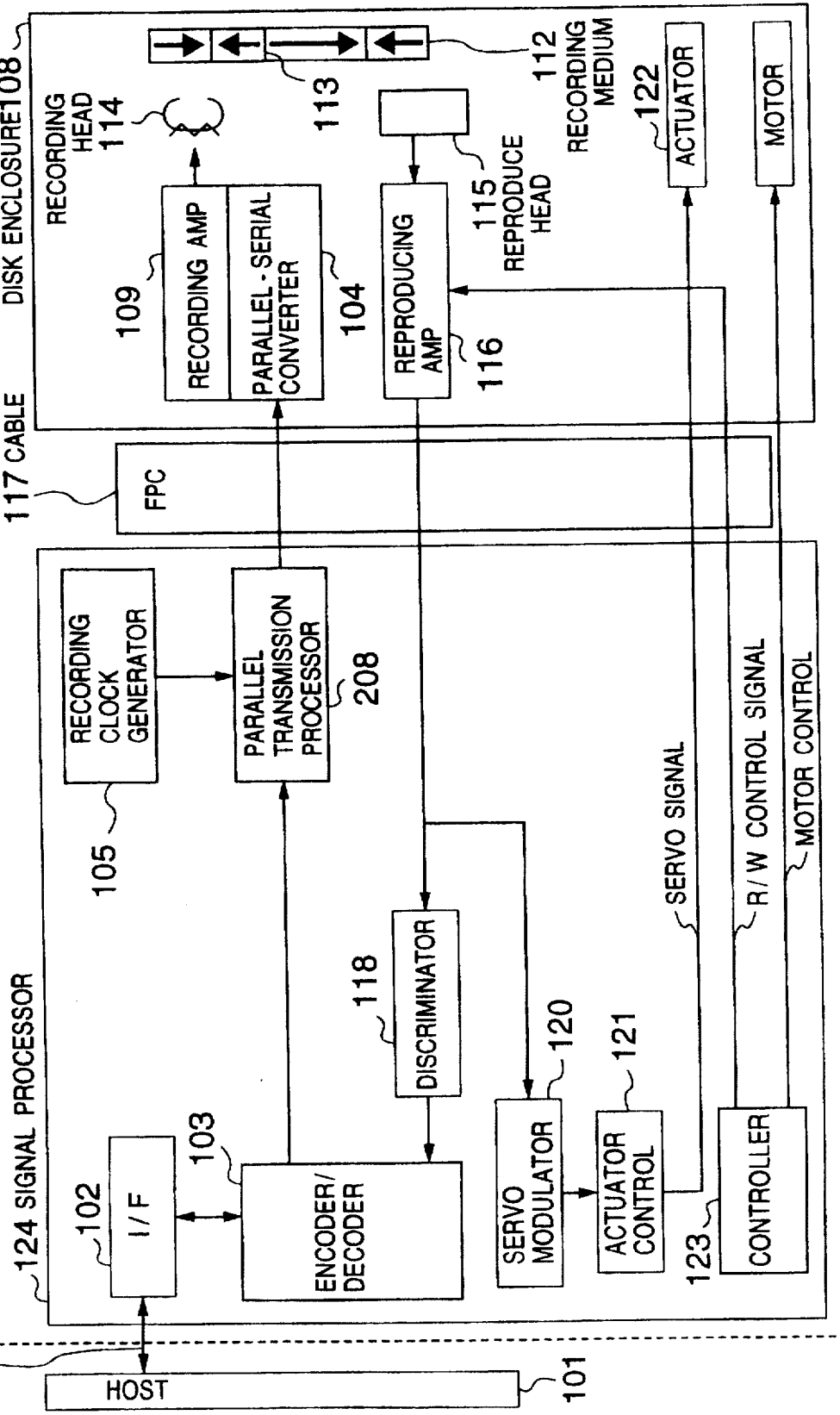
FIG. 17 is a block diagram of still further embodiment of the invention.

The sixth embodiment of the invention will be described with reference to FIG. 17.

The recording and reproducing channel of the magnetic disk system 100 of this embodiment is formed of the parallel interface 102, the encoder/decoder 103, the record clock generator 105, the recording amplifier 109, the record head 114, the recording medium 112, the reproduce head 115, the reproducing amplifier 116, the discriminating circuit 118 and the servo signal processing section (servo signal demodulator 120, actuator control circuit 121). The magnetic disk system 100 also has the recording and reproduced signal processor 124, the disk enclosure 108, and the transmission cable 117 of, for example, FPC that connects the processor and the enclosure to transmit the recording signal. In the magnetic disk system 100 the record clock generator 105 is provided in the recording and reproducing signal processor 124 as in the prior art so that each element can be operated in synchronism with the record clock therefrom, and the parallel transmission processing circuit is provided to supply data to a plurality of transmission lines and transmit it in parallel through the lines, in which case the data inversion time per line in the transmission cable 117 is longer than the period of the record clock and all the parallel data never cause state shift at the same time.

Figure 18:
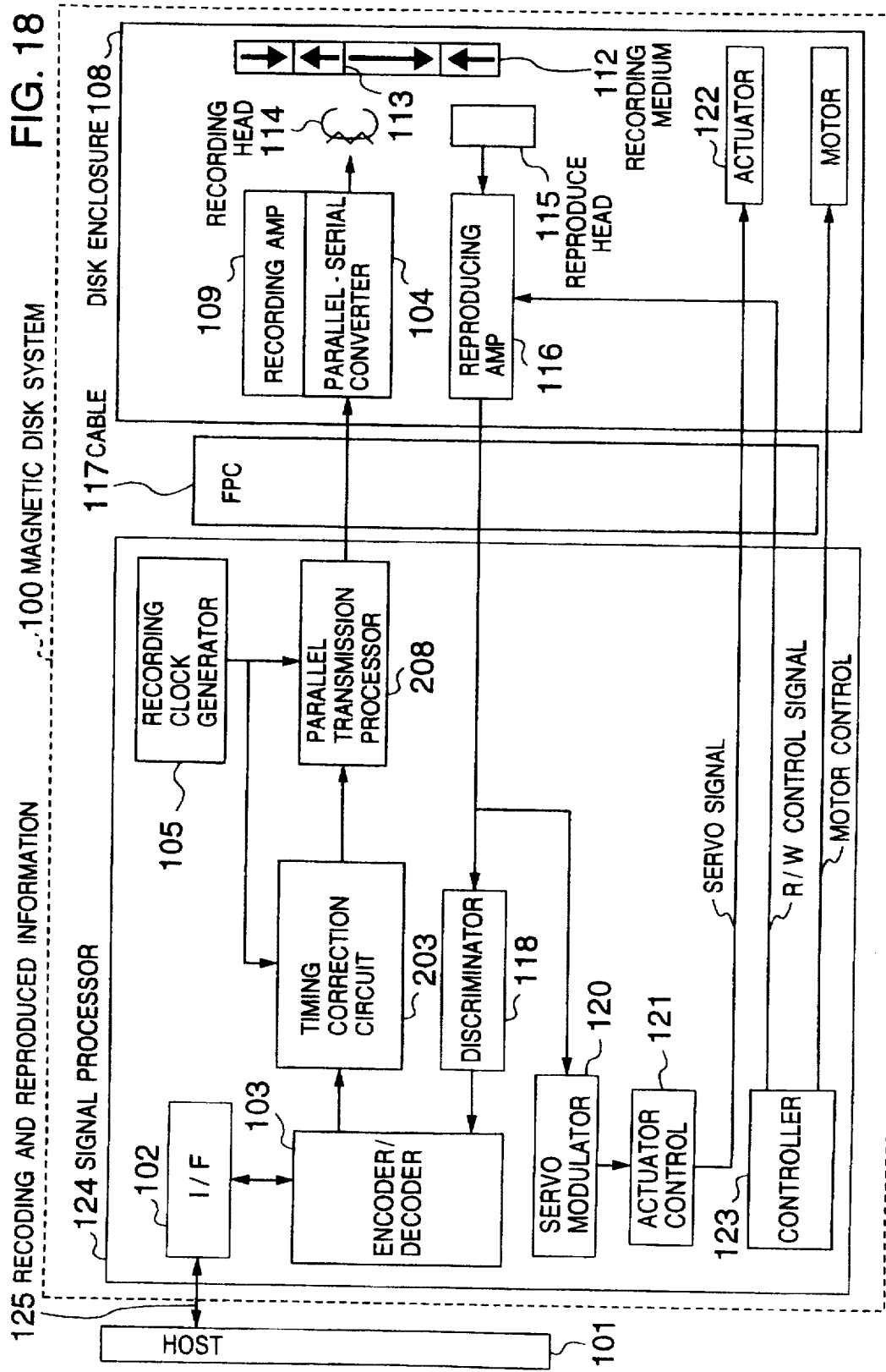
FIG. 18 is a block diagram of the embodiment of FIG. 17 with the record timing correction circuit added.

A modification of this embodiment is shown in FIG. 18. This modification is the addition of the record timing correction circuit 203 in this embodiment. In this embodiment, since recording data is transferred in parallel, the transmission frequency per line can be reduced. In addition, since edge data having a phase difference corresponding to the period of the record clock is transmitted, the transmission frequency is low, but the record clock timing can be sent as information. Therefore, there is no need to provide the record clock generator within the disk enclosure 108. Moreover, if the record timing correction circuit 203 is provided in the recording and reproducing processor 124 as in this modification, the edge data is corrected for the record timing and transmitted. Thus, the circuit scale within the disk enclosure 108 can be reduced, and hence the temperature rise due to the heat generated from the circuits can be suppressed. Furthermore, since the circuit portion can be provided out of the disk enclosure 108, the maintenance is also easy.

Figure 19:
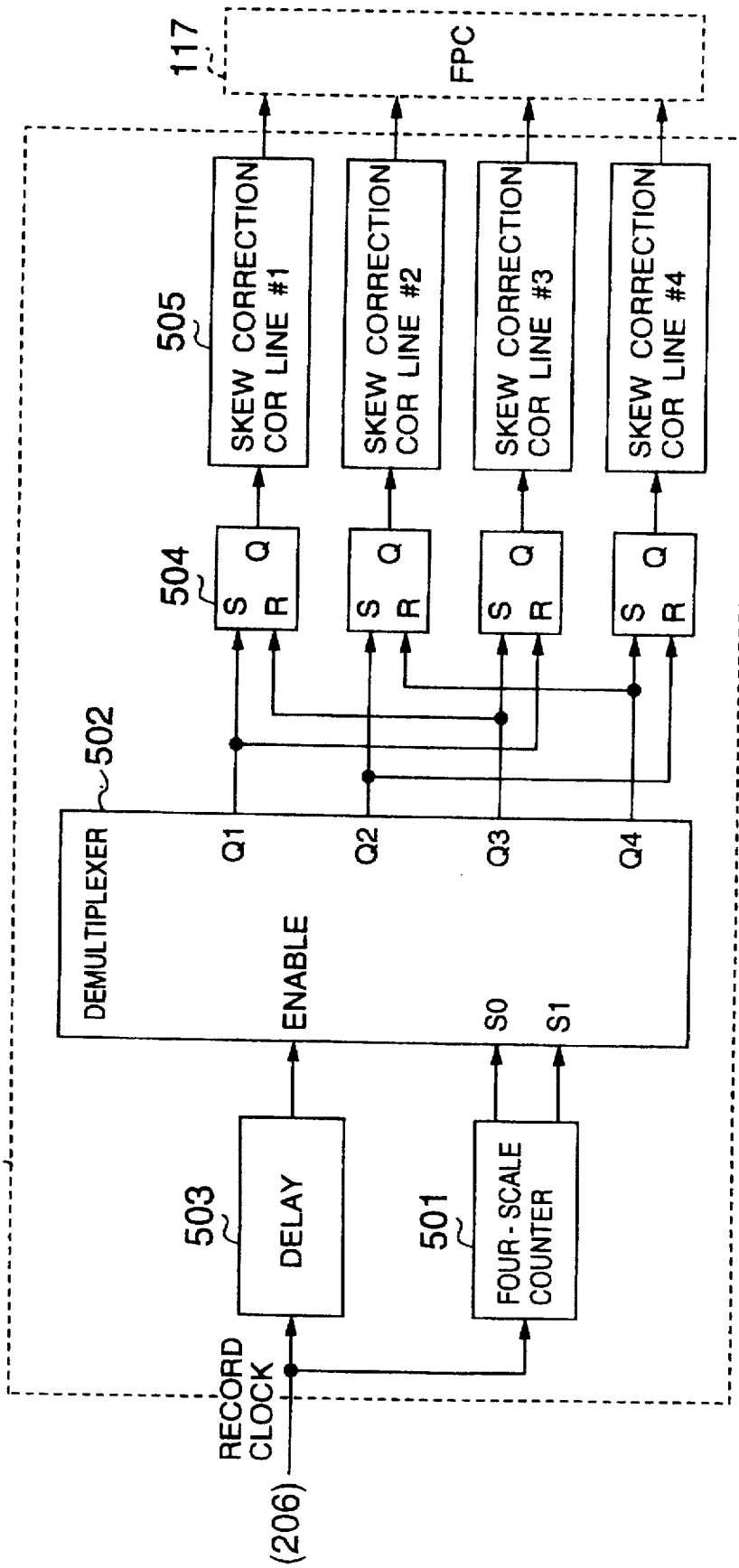
FIG. 19 is a block diagram for parallel transmission processing.

An example of the parallel transmission processing circuit 208 of this embodiment will be described with reference to FIGS. 19 and 20. FIG. 19 shows a four-line parallel data transfer type. The record timing correction circuit 203 corrects the recording data for the recording timing when the recording data is only "1", and sends the corrected pulse train to a quaternary or four-scale counter 501, which then produces each state according to the timing of the record clock. The output from the counter 501 is supplied to the output selection terminals (S0, S1) of a demultiplexer 502. After an output selection circuit of the demultiplexer 502 is set, the record clock signal is also supplied through a delay circuit 503, thereby delayed a certain propagation delay, and fed to the enable terminal of the demultiplexer 502.

The record clock signal at the enable terminal is produced at the selected output terminal. In addition, at the input ends of the respective transmission lines, there are provided set/reset type flip-flop circuits 504 the outputs of which are set by the record clock signal and reset by the record clock signal corresponding to other recording bits. This way of connection as illustrated always enables the timing of setting the flip-flop circuits to be used as the timing of the magnetization inversion.

If an N-line transmission cable is used, the transmission waveform of one period on each line corresponds to the time of N record clock pulses. Thus, the fundamental transmission frequency per line is 1/N that of one-line transmission cable. The timing of resetting is effective for minimizing the necessary transmission frequency band, and does not directly relate to the magnetization inversion timing. Thus, the reset timing can be freely designed. The reset timing will be better if resetting is made at (N/2) the record clock pulse after setting when N is even, or ((N+1)/2)th or ((N−1)/2)th record clock pulse after resetting when N is odd.

In the embodiment using four lines shown in FIG. 19, the first output Q1 from the demultiplexer 502 is supplied to the set terminal S of the flip-flop 504 for line #1. The output Q3 from the demultiplexer 502 that produces (4/2)=2, or the second record clock pulse after the setting record clock pulse is supplied to the reset terminal R. This way of connection makes it possible to reduce the necessary frequency band of the transmission line.

As one of the practical methods, the outputs from the flip-flops 504 are supplied through delay circuits 505, thereby compensated for the specific delay of each transmission line, and fed to the transmission cable 117 as a record timing signal.

Since a plurality of transmission lines are provided, the transmission frequency per line can be reduced and the transmission frequency band can be relatively widened as described above. The reason for this will be specifically described below.

Figure 21A:
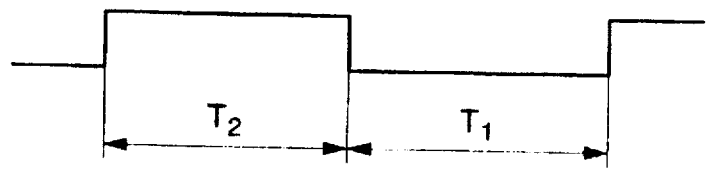
FIGS. 21A–21C show waveforms to which reference is made in explaining the idea of transmission frequency band relative to the amount of record timing correction, rise time and fall time.
Figure 21B:
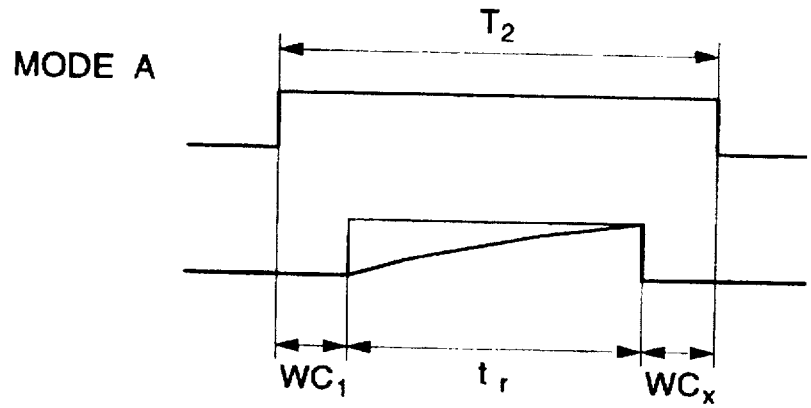
Figure 21C:
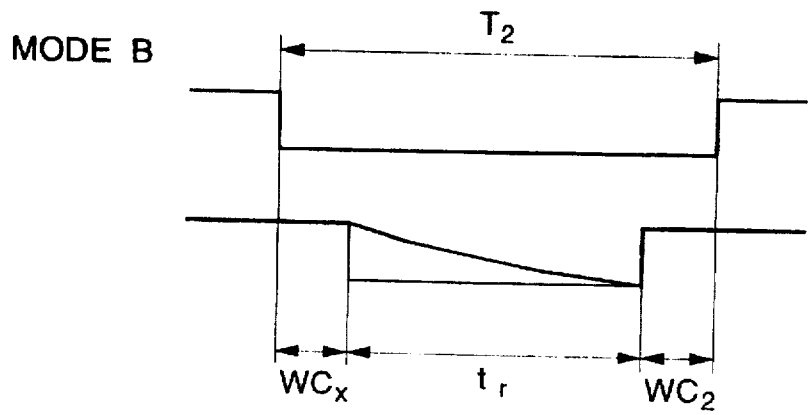

The transmissible frequency per line is the reciprocal of twice the larger one of the time T1 in mode A shown in FIG. 21B and the time T2 in mode B shown in FIG. 21C. The time T1 is the sum of a record timing correction time WC1, a rise time tr and a record timing correction time WCx, and the time T2 is the sum of a record timing correction time WCx, a fall time tf and a record timing correction time WC2. Thus, the number of lines necessary for data transfer is determined by one plus an integer resulting from dividing the frequency necessary for data transfer by the transmissible frequency per line. The number of transmission lines can be estimated by the following equation (5).

$$max\left[ INT\left[\frac{T_1}{T_b}\right]+1, INT\left[\frac{T_2}{T_b}\right]+1 \right] = N \quad (5)$$

$$INT\left[\frac{T}{T_b}\right] \quad (6)$$

$$max\lfloor A, B \rfloor \quad (7)$$

The expression (6) is to divide T by Tb and select the integer of the quotient, and the expression (7) is to select a larger one of A and B. In the above equation (5), T1 is the sum of WC1, rise time tr and WCx, T2 is the sum of WCx, fall time tf and WC2. Tb is the time between two magnetization inversions, or bit time. and N is the number of transmission lines. WC1, WC2 and WCx are amounts of record timing correction.

Thus, the number of necessary lines can be estimated from the data transfer rate and the transmissible frequency per line as above.

Figure 22:
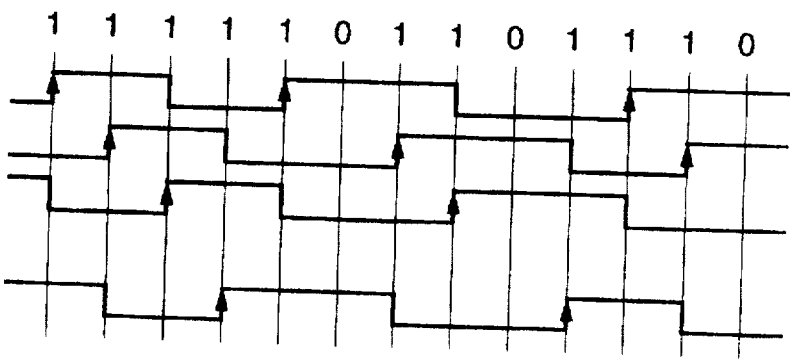
FIG. 22 shows an example of transmission system on a four-line transmission path.
Figure 23:
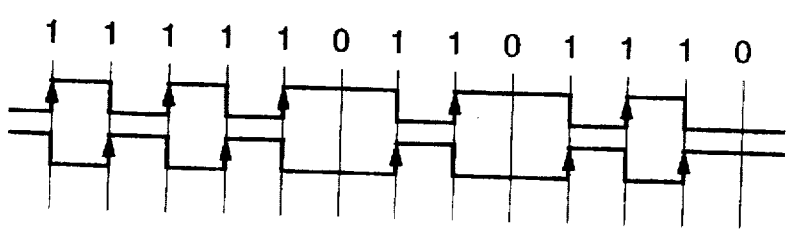
FIG. 23 shows an example of transmission system on a two-line transmission path.
Figure 24:
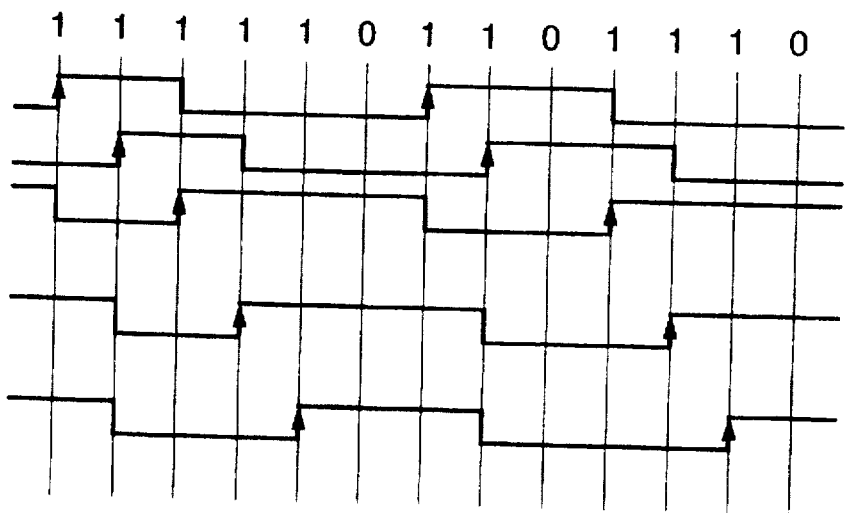
FIG. 24 shows an example of transmission system on a five-line transmission path.

FIGS. 22, 23 and 24 show signal division in examples of four lines, two lines and five lines. When the number of lines is even as in FIGS. 22 and 23, the interval from the rising edge to the following rising edge on each line equals to the interval from the falling edge to the following falling edge on the same line over the range of all "1"s.

When the number of lines is odd as in FIG. 24, the interval from the rising edge to the following rising edge on each line is narrower than the interval from the falling edge to the following falling edge on the same line over the range of all "1"s. Thus, if the allowable transmission frequency band of the odd-numbered lines is compared with that of the even-numbered lines, the latter can be considered to have a higher efficiency because the same performance as that of the even-numbered lines can be obtained if one is subtracted from the number of odd lines.

FIG. 25 is a block diagram of an optical disk system 100A including an optical disk or magnetooptical disk 112A for storing data, as another embodiment of the invention. In FIG. 25, like elements corresponding to those in FIG. 4 are identified by the same reference numerals. A recording and reproducing portion 99 for writing/reading data in the recording medium 112A has a light emitting device and a photosensitive device. In this optical disk system, the data transfer rate can be substantially improved over the conventional optical disk system that has a limit to the transfer rate due to the transmission frequency band of the transmission cable 117. The arrangement of the optical disk system of FIG. 25 can be variously changed and modified as in the embodiments of the magnetic disk system described so far.

We claim:

1. A data recording system for recording data in a recording medium, comprising:

a signal processor including an input circuit to which data is supplied and a clock generator generating a sequence of pulses, thereby providing said data with different phases of signal inversion in the form of parallel bits of data, each of said bits having mutually different inversion timings;

a transmission cable connected to said signal processor to transmit said parallel data having said different phases of signal inversion; and a disk enclosure including a converter connected to said transmission cable to convert said parallel data into serial data, data record and reproduce heads connected to said converter, and a recording medium.

2. A data recording system according to claim 1, wherein said transmission cable is a plurality of parallel lines that are matched in impedance at the junctions with said converter and said signal processor.

3. A data recording system according to claim 2, wherein said signal processor has a parallel transmission processing circuit that generates a plurality of logic values of data in series, and supplies a plurality of inversion signals each indicating one of said plurality of logic values to said plurality of parallel lines.

4. A data recording system according to claim 3, wherein said signal processor has a timing correction circuit for changing the time interval of certain signal changes within said clock generator.

5. A data recording system according to claim 2, wherein said signal processor has a parallel transmission processing circuit supplying a plurality of phase difference signals depending on the difference and equality between two adjacent values of data to said plurality of parallel lines of said transmission cable.

6. A data recording system according to claim 5, wherein the time interval of signal changes in said plurality of phase difference signals supplied to said plurality of lines of said transmission cable is at least twice the time interval of said two adjacent values of data.

7. A data recording system according to claim 4, wherein said timing correction circuit has a retrieval logic circuit that logically calculates said parallel data having said different phases of signal inversion and generates a signal (ENL) indicating which bit of said parallel data should be made to lead or lag.

8. A data recording system according to claim 7, wherein said timing correction circuit has storage means for storing said parallel data having said different phases of signal inversion at a certain timing pulse of said clock generator and said parallel data at the preceding timing pulse located just one pulse before said certain timing pulse, a converting circuit for converting parallel data to serial data, and a correction circuit for correcting the last bit of parallel data at preceding timing pulse and the forward (N-1) bits of said parallel data at said certain timing pulse of said record clock for their record timing on the basis of a pattern of the two bits of said parallel data at said preceding timing pulse of said record clock and the N bits of said parallel data at said certain timing pulse of said clock generator.

9. A data recording system according to claim 1, wherein said signal processor has servo signal processing circuits for servo-processing an analog signal reproduced from said data record and reproduce heads.

10. A data recording system according to claim 1, wherein said disk enclosure has a record clock for oscillating in synchronism with said sequence of pulses generated by said clock generator.

11. A data recording system according to claim 10, wherein said record clock changes an oscillation frequency in response to the position of said record and reproduce heads on said recording medium along the radius.

12. A data recording system according to claim 1, wherein said parallel data having said different phases of signal inversion never cause state transition at the same timing pulse of said record clock.

13. A data recording method for recording data on a recording medium, comprising the steps of:

supplying said data through an input circuit to a signal processor;

generating a sequence of pulses from a clock generator;

supplying data with different phases of signal inversion, provided from said sequence of pulses, in the form of parallel bits of data to a transmission cable of a plurality of parallel lines, each of said bits having mutually different inversion timings; and receiving said parallel data by a disk enclosure including data record and reproduce heads and a recording medium, and then converting said parallel data into serial data.

14. A data recording method according to claim 13, further comprising:

a step of generating a plurality of logic values of data in series from said signal processor; and a step of supplying a plurality of inversion signals respectively indicating said plurality of logic values to said plurality of parallel lines.

15. A data recording method according to claim 14, wherein said signal processor makes timing correction for the time interval of certain changes within said clock generator.

16. A data recording method according to claim 13, further comprising a step of supplying a plurality of phase difference signals depending on the difference and equality between two adjacent values of data to said plurality of parallel lines of said transmission cable.

17. A data recording method according to claim 16, wherein the time interval of signal changes in said plurality of phase difference signals supplied to said plurality of parallel lines of said transmission cable is at least twice the time interval of said adjacent values of data.

18. A data recording method according to claim 15, wherein said timing correction step has a step of logically calculating said parallel data having said different phases of signal inversion, and generating a signal (ENL) indicating which bit of said parallel data should be made to lead or lag.

19. A data recording method according to claim 18, wherein said timing correction step has a step of storing said parallel data having said different phases of signal inversion at a certain timing pulse of said record clock and said parallel data at the preceding timing pulse located just one pulse before said certain timing pulse, and a step of correcting the last bit of said parallel data at said preceding timing pulse and the forward (N-1) bits of said parallel data, beginning with the front bit, at said certain timing pulse of said record clock for their record timing on the basis of a pattern of the two bits of said parallel data at said preceding timing pulse of said record clock, beginning with the last bit, and the N bits of said parallel data at said certain timing pulse of said record clock.

20. A data recording method according to claim 13, wherein said parallel data having said different phases of signal inversion never cause state transition at the same timing pulse of said record clock.

* * * * *